(12) United States Patent
Ishizono et al.

(10) Patent No.: US 8,672,646 B2
(45) Date of Patent: Mar. 18, 2014

(54) SCROLL COMPRESSOR

(75) Inventors: Fumihiko Ishizono, Chiyoda-ku (JP);
Hideaki Maeyama, Chiyoda-ku (JP);
Takeshi Fushiki, Chiyoda-ku (JP); Taro Kato, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 540 days.

(21) Appl. No.: 12/992,151

(22) PCT Filed: Jun. 12, 2009

(86) PCT No.: PCT/JP2009/060782
§ 371 (c)(1),
(2), (4) Date: Nov. 11, 2010

(87) PCT Pub. No.: WO2009/154151
PCT Pub. Date: Dec. 23, 2009

(65) Prior Publication Data
US 2011/0081264 A1   Apr. 7, 2011

(30) Foreign Application Priority Data
Jun. 16, 2008   (JP) ................................. 2008-156743

(51) Int. Cl.
*F04B 35/04*   (2006.01)
*F01C 1/063*   (2006.01)
(52) U.S. Cl.
USPC ..................................... 417/410.5; 418/55.1

(58) Field of Classification Search
CPC .................... F05C 2201/021; F04C 2210/263; F04C 2210/268
USPC ........................................ 417/410.5; 418/55.1
See application file for complete search history.

(56) References Cited

U.S. PATENT DOCUMENTS

| 3,034,004 | A | * | 5/1962 | Von Cube et al. .............. 310/87 |
| 5,131,828 | A | | 7/1992 | Richardson, Jr. et al. |
| 5,263,834 | A | | 11/1993 | Sato et al. |

(Continued)

FOREIGN PATENT DOCUMENTS

| JP | 4-358784 A | 12/1992 |
| JP | 5-126070 A | 5/1993 |

(Continued)

OTHER PUBLICATIONS

International Search Report (PCT/ISA/210) issued on Sep. 15, 2009, by Japanese Patent Office as the International Searching Authority for International Application No. PCT/JP2009/060782.

(Continued)

*Primary Examiner* — Charles Freay
(74) *Attorney, Agent, or Firm* — Buchanan Ingersoll & Rooney PC

(57) ABSTRACT

A scroll compressor has an electric motor portion, a compression mechanism portion connected to the electric motor portion, and an oil sump for lubricating oil in a sealed container and compresses a refrigerant in the compression mechanism portion. A used refrigerant is a halogenated hydrocarbon or a hydrocarbon having a carbon double bond in the composition or is a mixture containing one of the same. A sliding surface of at least one of two components constituting a sliding portion having a relation of sliding to each other in a sealed container is structured in such a way that an iron metal or an aluminum metal is not directly exposed.

16 Claims, 18 Drawing Sheets

(56) References Cited

U.S. PATENT DOCUMENTS

| | | | |
|---|---|---|---|
| 5,312,229 A | | 5/1994 | Sano et al. |
| 5,842,845 A | * | 12/1998 | Kawano et al. .............. 418/55.3 |
| 2004/0222402 A1 | * | 11/2004 | Minor et al. .................... 252/68 |

FOREIGN PATENT DOCUMENTS

| | | |
|---|---|---|
| JP | 6-159242 A | 6/1994 |
| JP | 8-177773 A | 7/1996 |
| JP | 9-112448 A | 5/1997 |
| JP | 09-195956 A | 7/1997 |
| JP | 10-238481 A | 9/1998 |
| JP | 10-279930 A | 10/1998 |
| JP | 11-107935 A | 4/1999 |
| JP | 11-107938 A | 4/1999 |
| JP | 2000-274360 A | 10/2000 |
| JP | 2007-064058 A | 3/2007 |
| JP | 2007-255379 A | 10/2007 |
| JP | 2008-505989 A | 2/2008 |
| WO | 2005-103191 A2 | 3/2005 |

OTHER PUBLICATIONS

Office Action (Notification of Reason for Refusal) dated Nov. 13, 2012, issued in corresponding Japanese Patent Application No. 2010-517895, and an English Translation thereof. (6 pages).

Chinese First Office Action dated Feb. 4, 2013 issued in the corresponding Chinese Patent Application No. 200980122807.X and English language translation (20 pages).

Japanese Notice of Reasons for Rejection dated Apr. 23, 2013 issued in the corresponding Japanese Patent Application No. 2010-517895 and English language translation (6 pages).

Chinese Second Office Action dated Nov. 5, 2013 issued in the corresponding Chinese Patent Application No. 200980122807.X and English language translation (17 pages).

* cited by examiner

SCROLL COMPRESSOR

TECHNICAL FIELD

The present invention relates to a scroll compressor for use in a refrigeration air-conditioner, and more particularly to a scroll compressor that compresses a refrigerant which is a halogenated hydrocarbon or a hydrocarbon each having a carbon double bond in the composition thereof or a mixture containing thereof.

BACKGROUND ART

As measures against global warming in recent years, the inventors have examined a scroll compressor that uses a refrigerant having a low, so-called, global warming potential (GWP). It has been gradually revealed that using a refrigerant which is a halogenated hydrocarbon or a hydrocarbon each having a carbon double bond in the composition thereof or a mixture containing thereof is promising as measures against global warming.

Heretofore, there is a literature in which R1270 (propylene) is mentioned as a refrigerant (e.g., Patent Literature 1). However, it is described as an example of hydrocarbons together with other hydrocarbons not having a double bond and is not mentioned as an example of the halogenated hydrocarbon or the hydrocarbon each having a carbon double bond in the composition thereof.

CITATION LIST

Patent Literature

PTL 1: Japanese Unexamined Patent Application Publication No. 2000-274360

SUMMARY OF INVENTION

Technical Problem

The halogenated hydrocarbon or hydrocarbon having a carbon double bond in the composition has a tendency that thermal or chemical stability is likely to decrease to cause decomposition or polymerization compared with a composition having no double bond. Therefore, a technique for controlling the occurrence of a chemical reaction of the refrigerant is required. In general, for polymerization of hydrocarbons, a high temperature and high pressure environment and catalyst such as metals for accelerating a chemical reaction are used. In the inside of the scroll compressor, conditions corresponding to the above is easily made by each sliding portion in which iron metal or aluminum metal is exposed. Therefore, when the refrigerant which is a halogenated hydrocarbon or a hydrocarbon having a carbon double bond in the composition or a mixture containing thereof is used, the following problems arise.

More specifically, in the sliding portion of the scroll compressor with which the refrigerant may contact, the double bond of the halogenated hydrocarbon or hydrocarbon having the carbon double bond in the composition is decomposed or polymerized and generates sludge, which deteriorates the sliding state of the compressor or blocks a compression tube portion of a capillary tube or the like in a refrigeration circuit, and thus the reliability of the refrigeration air-conditioner may decrease.

The invention has been made in order to solve the above-described problems. It is an object of the invention to provide a high-reliability scroll compressor capable of suppressing the occurrence of decomposition or polymerization due to the chemical reaction of the refrigerant even when the refrigerant which is a halogenated hydrocarbon or a hydrocarbon having a carbon double bond in the composition or a mixture containing thereof is used.

Solution to Problem

A scroll compressor of the invention has, in a sealed container, an electric motor portion, a compression mechanism portion connected to the electric motor portion, and an oil sump for lubricating oil and compresses a refrigerant in the compression mechanism portion. In the scroll compressor, the refrigerant to be used is a halogenated hydrocarbon or a hydrocarbon each having a carbon double bond in the composition thereof or is a mixture containing either one of the halogenated hydrocarbon or the hydrocarbon. A sliding surface of at least either one of two components constituting a sliding portion in which the two components are slidable to each other in the sealed container is structured so that iron metal or aluminum metal is not directly exposed. Specifically, materials of the corresponding portions are formed with non-metal materials, such as ceramics or resin, or the corresponding portions are subjected to coating treatment or film formation treatment.

Advantageous Effects of Invention

In order to suppress decomposition or polymerization due to a chemical reaction in a sliding portion in the compressor of the refrigerant which is a halogenated hydrocarbon or a hydrocarbon each having a carbon double bond in the composition thereof, the scroll compressor of the invention is structured so that the iron metal or the aluminum metal that can serve as a metal catalyst that promotes the chemical reaction is not directly exposed to the slide surface of the sliding portion in the compressor. Therefore, even in the sliding portion of the scroll compressor in which the temperature and the pressure are likely to increase, the decomposition or polymerization of the refrigerant is suppressed, and thus the generation of sludge is suppressed to suppress troubles of the compressor or blocking in a refrigeration circuit, which allows obtaining reliability over a long period of time of the compressor.

DESCRIPTION OF EMBODIMENTS

Figure 1:
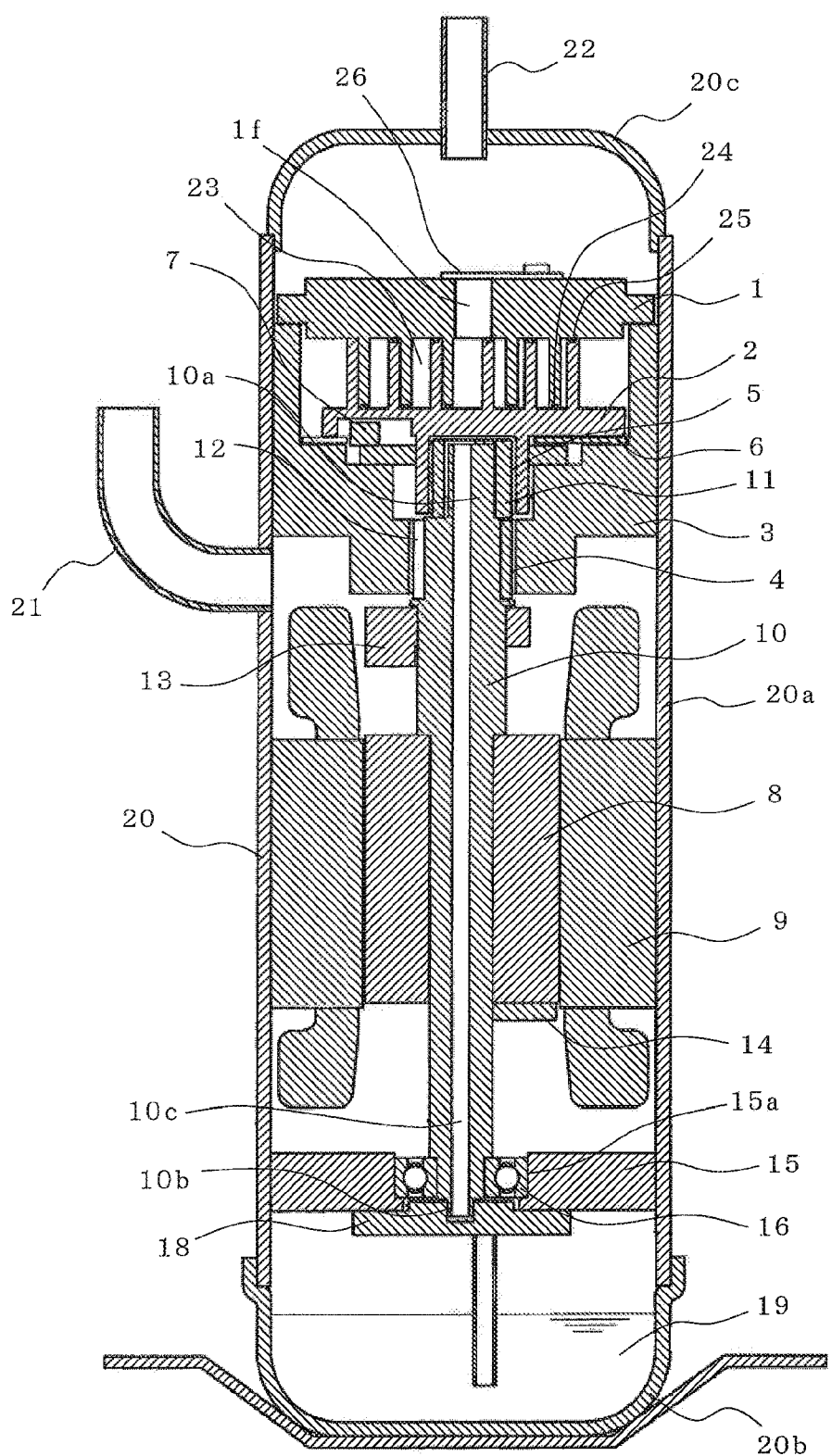
FIG. 1 is a structure diagram showing the structure of a scroll compressor according to Embodiment 1 of the invention.

A refrigerant to be used in a scroll compressor of the embodiment of the invention is as follows.
(1) Halogenated hydrocarbon having a carbon double bond in the composition thereof: For example, "HFO-1234yf ($CF_3CF=CH_2$)" in which the global warming potential (GWP) is as low as about 4 is mentioned.
The "HFO" is the abbreviation for "Hydro-Fluoro-Olefin" and the "Olefin" refers to an unsaturated hydrocarbon having one double bond.
(2) Hydrocarbon having a carbon double bond in the composition thereof: For example, "R127O (propylene)" is mentioned. The "R127O" has a GWP of about 3, which is smaller than the GWP of the "HFO-1234yf" but the inflammability is higher than that of the "HFO-1234yf".
(3) A mixture containing at least either one of the halogenated hydrocarbon or the hydrocarbon each having a carbon double bond in the composition thereof: For example, a mixture of the "HFO-1234yf" and "R32" or "R41" is mentioned. The pressure loss of the "HFO-1234yf" becomes larger due to a low-pressure refrigerant and the performance of the "HFO-1234yf" is likely to decrease in a refrigeration cycle. Therefore, mixtures of the "HFO-1234yf" and the "R32", the "R41", or the like, which is a high-pressure refrigerant whose pressure is higher than that of the "HFO-1234yf" are preferable for practical use.

The embodiments of the invention will be successively described below on the assumption of the use of the refrigerants described above. In each drawing, the same elements or the equivalents are designated by the same reference numerals.

Embodiment 1

FIG. 1 is a structure diagram showing the structure of a scroll compressor according to Embodiment 1 of the invention. The scroll compressor has a fixed scroll 1, a swing scroll 2, a frame 3 that fixes the fixed scroll 1, a main bearing 4 positioned at the center of the frame 3, and a swing bearing positioned at the center of the swing scroll 2. The scroll compressor further has a thrust plate 6 serving as a thrust bearing that supports the swing scroll 2 in the axis direction, an Oldham ring 7 that prevents rotation of the swing scroll 2 and applies swing movement thereto, and an electric motor rotor 8 and an electric motor stator 9 that constitute an electric motor.

The scroll compressor further has a main axis 10 that is rotated and driven by the electric motor, a slider 11 that supports the swing scroll 2 in order to revolve the swing scroll 2, and a decentrated slider axis 10a, serving as a slider attachment axis, which is provided at the upper portion of the main axis 10 so that the slider 11 is decentrated relative to the main axis 10. The scroll compressor further has a sleeve 12 that is positioned near the decentrated slider axis 10a and smoothly rotates the main bearing 4 positioned at the center of the frame 3 and balancers 13 and 14 that cancel unbalance of the rotation center of the swing scroll 2 that swings by the decentrated slider axis 10a of the main axis 10 and the main axis 10.

A sub-frame 15 is provided at a lower portion in the axis direction of the main axis 10 and the outer ring of a ball bearing 16 is press-fitted to a bearing storage portion 15a that is formed at the center of the sub-frame 15. The sub-frame 15 has a volume controlled oil pump 18 and a pump axis 10b that transmits rotational force to the oil pump 18 is integrally molded with the main axis 10. An oil hole 10c that penetrates from the lower end of the pump axis 10b to the upper end of the main axis 10 is formed at the center of the main axis 10 and the oil hole 10c communicates with the oil pump 18 at the lower end side.

A sealed container 20 that accommodates the respective elements contains three portions of a sealed container trunk portion 20a, a sealed container lower portion 20b, and a sealed container upper portion 20c. At the upper stage of the sealed container trunk portion 20a, a compressor mechanism portion containing the fixed scroll 1, the swing scroll 2, the frame 3, etc., is disposed and an inhalation pipe 21 for taking a refrigerant into the container is also provided. At the lower stage of the sealed container trunk portion 20c, the electric motor rotor 8 or the electric motor stator 9 are disposed. At the sealed container lower portion 20b, the oil sump 19 is formed. At the sealed container upper portion 20c, a discharge pipe 22 that discharges a compressed refrigerant to the outside of the container is provided.

Figure 2:
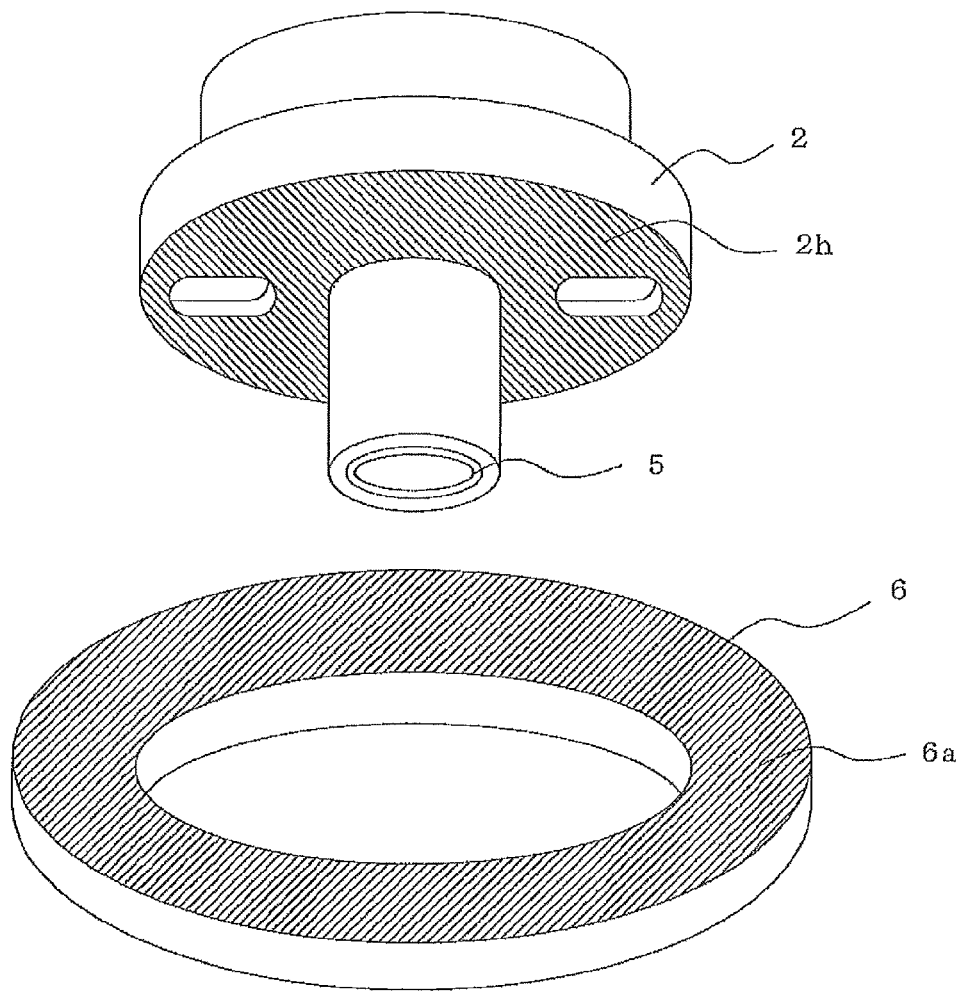
FIG. 2 is an explanatory view of a sliding portion containing a swing scroll and a thrust plate in the compressor of the aspect of FIG. 1.

FIG. 2 is an explanatory view of a sliding portion containing the swing scroll 2 and the thrust plate 6 in the compressor of the aspect of FIG. 1. The thrust plate 6 serves as the thrust bearing that supports the swing scroll 2 in the axis direction. The swing scroll 2 and the thrust plate 6 are slidable to each other and constitute the sliding portion. More specifically, a thrust bearing portion 2h is formed at the back surface (surface opposite to the surface having a spiral shape) of the swing scroll 2 and is adhered to a slide surface 6a of the thrust plate 6 through lubricating oil and constitute the thrust bearing.

The swing scroll 2 is formed with iron metal, such as cast iron, or an Al—Si alloy metal and the surface of the swing scroll 2 including the thrust bearing portion 2h is subjected to coating of any one of DLC (diamond-like carbon), DLC-Si (diamond-like carbon silicon), CrN (chromium nitride), TiN (titanium nitride), TiCN (titanium carbonitride), WCC (tungsten carbide coating), VC (vanadium carbide), etc., or film formation treatment of any one of a manganese phosphate film, a molybdenum disulfide film, etc.

The thrust plate 6 is formed with iron metal or aluminum metal and the surface of the thrust plate 6 including the slide surface 6a is subjected to coating of any one of DLC, DLC-Si, CrN, TiN, TiCN, WCC, VC, etc., or film formation treatment of any one of a manganese phosphate film, a molybdenum disulfide film, etc.

Figure 3:
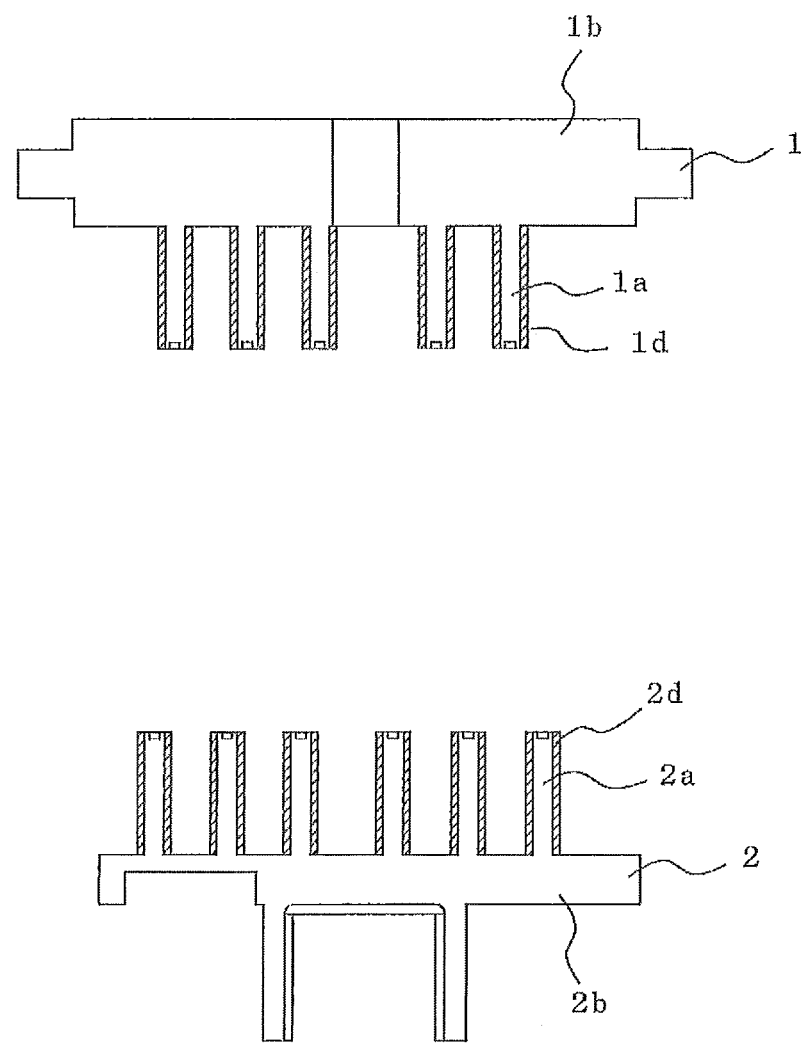
FIG. 3 is an explanatory view of a sliding portion containing the swing scroll and a fixed scroll in the compressor of the aspect of FIG. 1.

FIG. 3 is an explanatory view of a sliding portion containing the swing scroll 2 and the fixed scroll 1 in the compressor of the aspect of FIG. 1. A lap portion 2a that constitutes the spiral shape of the swing scroll 2 and a lap portion 1a that constitutes the spiral shape of the fixed scroll 1 are slidable to each other and constitute the sliding portion. More specifically, the lap portion 2a formed in the spiral shape substantially perpendicular to a panel 2b of the swing scroll 2 and the lap portion 1a formed in the spiral shape substantially perpendicular to a panel 1b of the fixed scroll 1 are adhered to each other through lubricating oil to constitute a compression chamber 23.

The lap portion 2a of the swing scroll 2 is formed with iron metal, such as cast iron, or an Al—Si alloy metal, which is the same material as that of the swing scroll 2. However, the surface of the swing scroll 2 including a side surface 2d of the lap portion 2a is subjected to coating of any one of DLC, DLC-Si, CrN, TiN, TiCN, WCC, VC, etc., or film formation treatment of any one of a molybdenum disulfide film, a manganese phosphate film, etc.

The lap portion 1a of the fixed scroll 1 is formed with iron metal, such as cast iron, or an Al—Si alloy metal that is the same material as that of the fixed scroll 1. However, the surface of the fixed scroll 1 including a side surface 1d of the lap portion 1a is subjected to coating of any one of DLC, DLC-Si, CrN, TiN, TiCN, WCC, VC, etc., or film formation treatment of a manganese phosphate film, a molybdenum disulfide film, etc.

Figure 4:
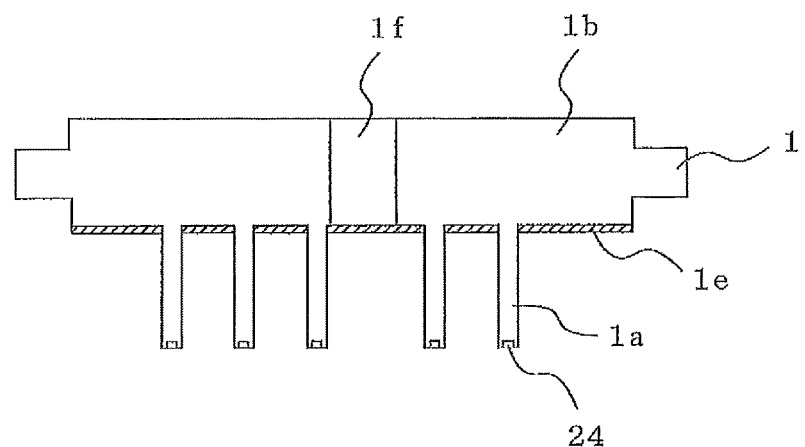
FIG. 4 is an explanatory view of a sliding portion containing the swing scroll and a seal and the fixed scroll and a seal in the compressor of the aspect of FIG. 1.
Figure 4:
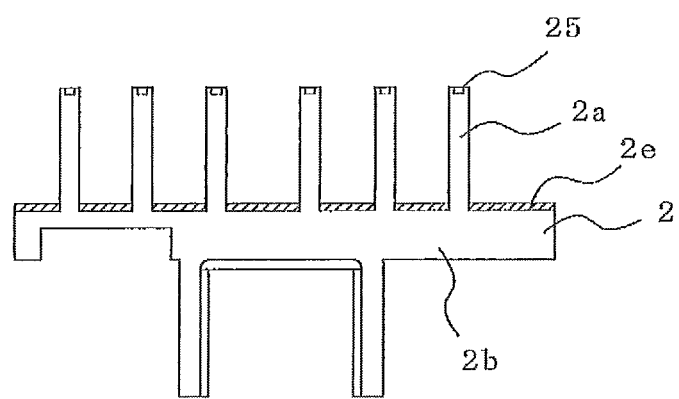

FIG. 4 is an explanatory view of a sliding portion containing the swing scroll 2 and a seal provided at the top end surface of the lap portion of the fixed scroll 1 and the fixed scroll and a seal provided at the top end surface of the lap portion of the swing scroll 2 in the compressor of the aspect of FIG. 1.

In order to reduce the leak of a refrigerant from the top end surface of each of the lap portions 1a and 2a when the lap portion 2a of the swing scroll 2 and the lap portion 1a of the fixed scroll 1 are adhered to each other through lubricating oil to constitute the compression chamber 23, seals 24 and 25 are provided in grooves provided at the top end surfaces thereof in accordance with the spiral shape. The seal 24 is provided at the top end surface of the lap portion 1a of the fixed scroll 1. The seal 24 portion and a bottom 1 and 2e at the side of the lap portion 2a of the panel 2b of the swing scroll 2 are slidable to each other and constitute the sliding portion. The seal 25 is provided at the top end surface of the lap portion 2a of the swing scroll 2. The seal 25 portion and a bottom land 1e at the side of the lap portion 1a of the panel 1b of the fixed scroll 1 are slidable to each other and constitute the sliding portion. These seals 24 and 25 are formed with non-metal materials, such as PTFE (polytetrafluoroethylene), PPS (polyphenylene sulfide), LCP (liquid crystal polymer), or ceramics.

The bottom 1 and 1e of the fixed scroll 1 is formed with iron metal, such as cast iron, or an Al—Si alloy metal, which is the same material as that of the fixed scroll 1. However, the surface of the fixed scroll 1 including the bottom land 1e of the fixed scroll 1 is subjected to coating of any one of DLC, DLC-Si, CrN, TiN, TiCN, WCC, VC, etc., or film formation treatment of any one of a manganese phosphate film, a molybdenum disulfide film, etc.

The bottom land 2e of the swing scroll 2 is formed with iron metal, such as cast iron, or an Al—Si alloy metal, which is the same material as that of the swing scroll 2. However, the surface of the swing scroll 2 including the bottom land 2e of the swing scroll 2 is subjected to coating of any one of DLC, DLC-Si, CrN, TiN, TiCN, WCC, VC, etc., or film formation treatment of any one of a manganese phosphate film, a molybdenum disulfide film, etc.

Figure 5:
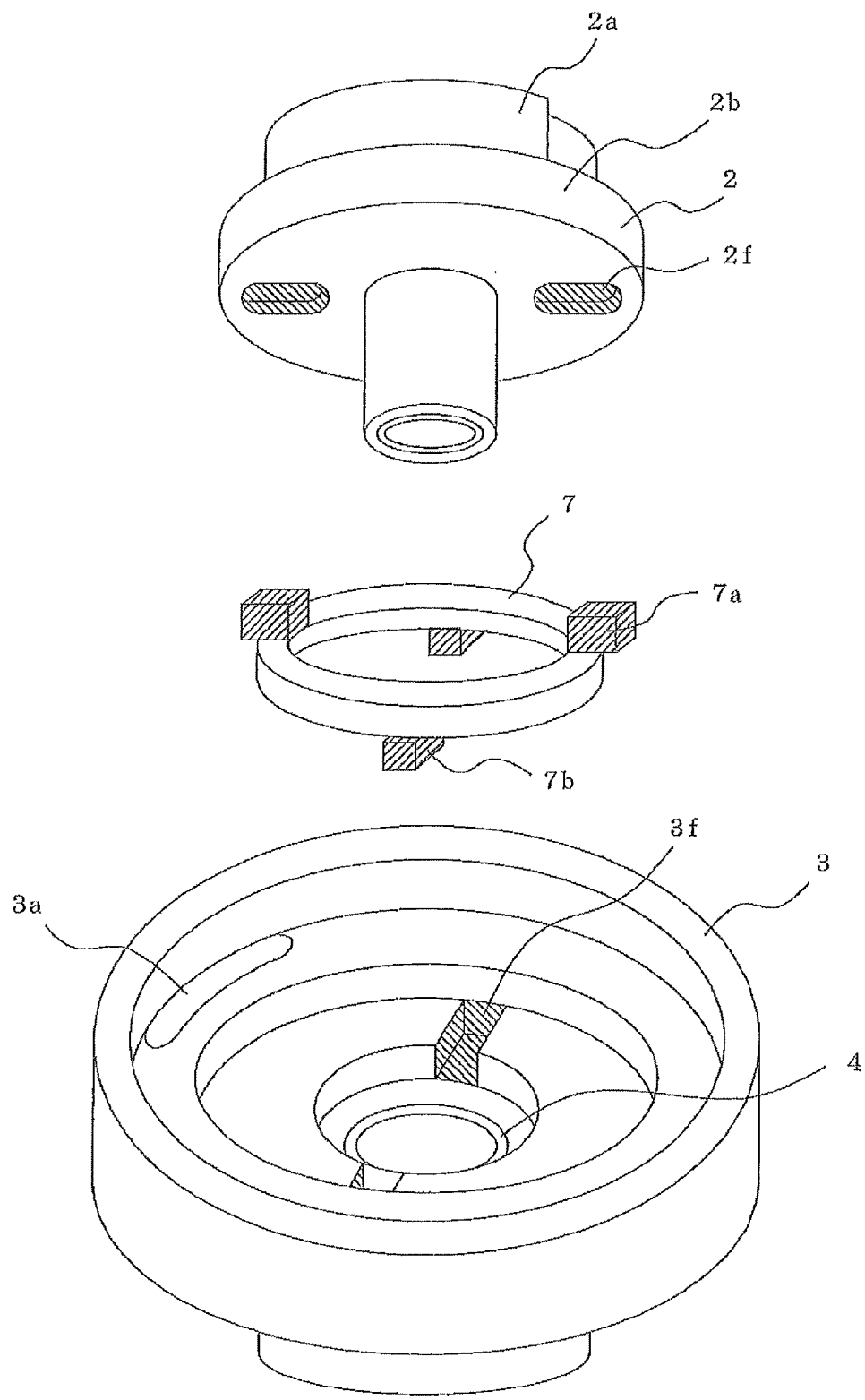
FIG. 5 is an explanatory view of a sliding portion containing the swing scroll and an Oldham ring and the Oldham ring and a frame in the compressor of the aspect of FIG. 1.

FIG. 5 is an explanatory view of a sliding portion containing the swing scroll 2 and the Oldham ring 7, and the Oldham ring 7 and the frame 3 in the compressor of the aspect of FIG. 1.

Oldham grooves 2f provided in the back surface opposite to the side where the lap portion 2a of the mirror panel 2b of the swing scroll 2 is formed and upper convex portions 7a that are keys of the Oldham ring 7 are in a relation to be slidable to each other and constitute the sliding portion. Oldham grooves 3f provided near the main bearing 4 of the frame 3 and lower convex portions 7b that are keys of the Oldham ring 7 are in a relation to be slidable to each other and constitute the sliding portion. More specifically, the back surface opposite to the side the lap portion 2a of the panel 2b of the swing scroll 2 is formed has the Oldham grooves 2f that accommodate the upper convex portions 7a of the Oldham ring 7 to slide the same so as to prevent the rotation of the swing scroll 2 to apply swing movement to the swing scroll 2d.

The Oldham grooves 2f are formed with iron metal, such as cast iron, or an Al—Si alloy metal, which is the same material as that of the swing scroll 2. However, the surface of the swing scroll 2 including the Oldham grooves 2f of the swing scroll 2 is subjected to coating of any one of DLC, DLC-Si, CrN, TiN, TiCN, WCC, VC, etc., or film formation treatment of any one of a manganese phosphate film, a molybdenum disulfide film, etc.

Moreover, by providing the Oldham grooves 3f in the frame 3 to be fastened to the fixed scroll 1 and accommodating the lower convex portions 7b of the Oldham ring 7, the swing scroll 2 can swing relative to the fixed scroll 1.

The Oldham grooves 3f of the frame 3 are formed with iron metal, such as cast iron, which is the same material as that of the frame 3. However, the surface of the frame 3 including the Oldham grooves of the frame 3 is subjected to coating of any one of DLC, DLC-Si, CrN, TiN, TiCN, WCC, VC, etc., or film formation treatment of any one of a manganese phosphate film, a molybdenum disulfide film, etc.

The respective convex portions 7a and 7b of the Oldham ring 7 are formed with high-rigidity and lightweight materials, such as iron metal, such as sintering, or an aluminum alloy metal, which is the same material as that of the Oldham ring 7. However, the surface of the Oldham ring 7 including the respective convex portions 7a and 7b is subjected to coating of any one of DLC, DLC-Si, CrN, TiN, TiCN, WCC, VC, etc., or film formation treatment of any one of a manganese phosphate film, a molybdenum disulfide film, etc.

Figure 6:
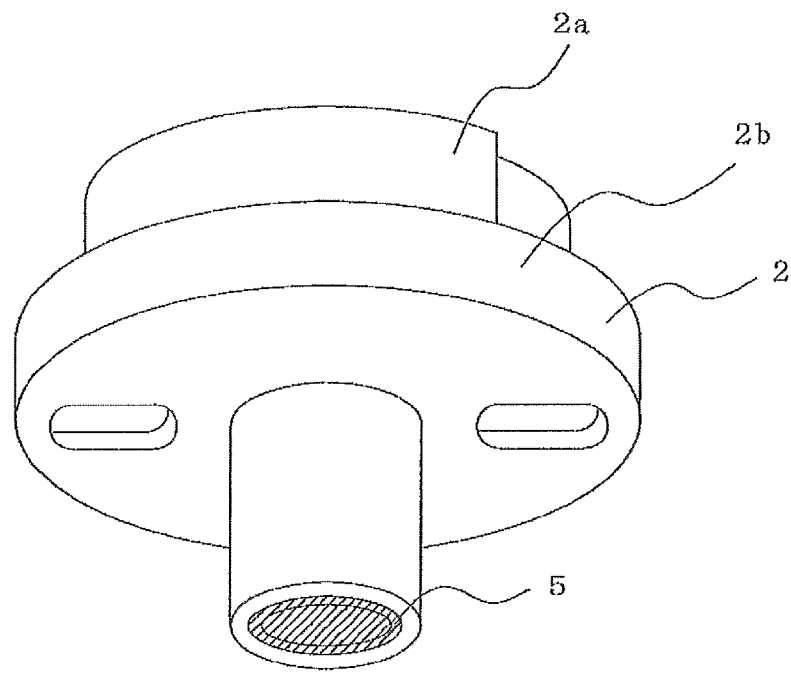
FIG. 6 is an explanatory view of a sliding portion containing the swing scroll and a slider and the slider and a main axis in the compressor of the aspect of FIG. 1.
Figure 6:
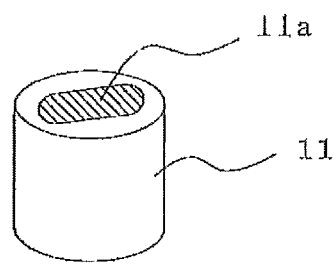
Figure 6:
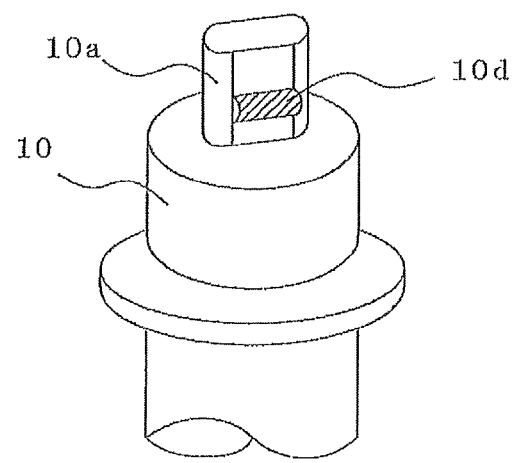

FIG. 6 is an explanatory view of the sliding portion containing the swing scroll 2 and a slider 11 and the slider 11 and the main axis 10 in the compressor of the aspect of FIG. 1.

The inner circumference of the swing bearing 5 provided at the center of the back surface opposite to the side of the panel 2b of the swing scroll 2 on which the lap portion 2a is formed and the outer circumference of the slider 11 that is decentrated relative to the rotation center of the main axis 10 and drives the swing axis are slidable to each other and constitute the sliding portion. Moreover, the decentrated slider axis 10a to which the slider 11 is attached and a slide surface 11a inside the slider 11 are slidable to each other and constitute the sliding portion. More specifically, the slider 11 is accommodated inside the swing bearing 5, and then the inner circumference of the swing bearing 5 and the outer circumference of the slider 11 are adhered to each other through lubricating oil to constitute the swing bearing portion. The decentrated slider axis 10a of the main axis 10 is inserted into the Slider 11. To the slide surface 11a inside the slider 11 through lubricating oil, a first pivot portion 10d that is provided substantially at the center of the plane portion of the decentrated slider axis 10a is adhered. The first pivot portion 10d is a portion projected from the plane portion in an approximately circular shape or an approximately spherical shape.

For the inner circumferential surface of the swing bearing 5, a non-metal bearing containing PTFE, POM (polyacetal), carbon, etc., as the main ingredients, is used. The slider 11 is formed with high-hardness iron metal, such as sintering or alloy tool steel. However, the outer circumferential surface of the slider 11 or the surface of the slider 11 including the slide surface 11a is subjected to coating of any one of DLC, DLC-Si, CrN, TiN, TiCN, WCC, VC, etc., or film formation treatment of any one of a manganese phosphate film, a molybdenum disulfide film, etc.

The first pivot portion 10d is formed with iron metal, such as cast iron or alloy steel for machine structures, which is the same material as that the main axis 10. However, the surface of the main axis 10 including the first pivot portion 10d is subjected to coating of any one of DLC, DLC-Si, CrN, TiN, TiCN, WCC, VC, etc., or film formation treatment of any one of a manganese phosphate film, a molybdenum disulfide film, etc.

Figure 7:
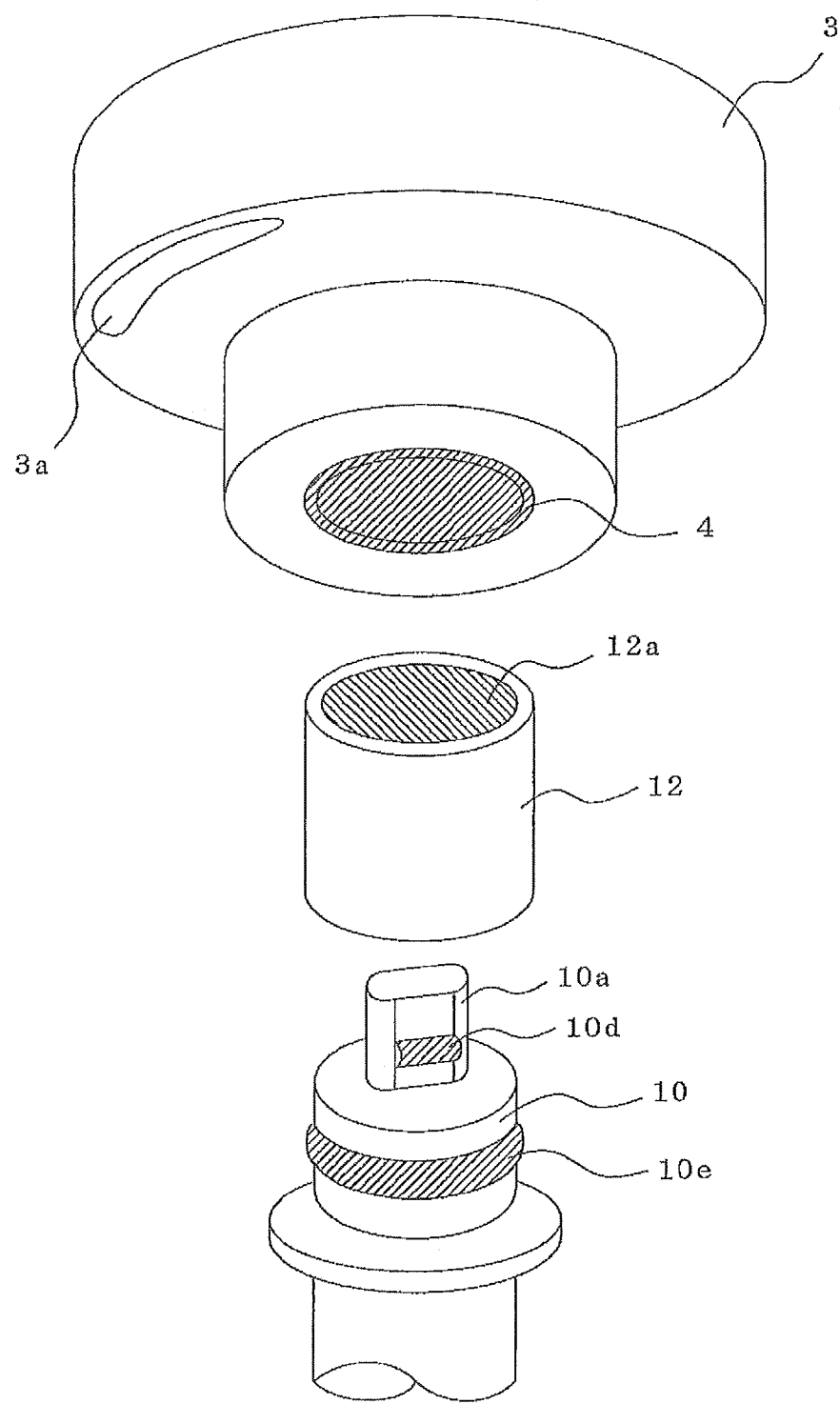
FIG. 7 is an explanatory view of a sliding portion containing the frame and a sleeve and the sleeve and the main axis in the compressor of the aspect of FIG. 1.

FIG. 7 is an explanatory view of the sliding portion containing the frame 3 and a sleeve 12, and the sleeve 12 and the main axis 10 in the compressor of the aspect of FIG. 1.

The inner circumference of the frame bearing 4 provided at the center of the frame 3 and the outer circumference of the sleeve 12 are in a relation to be slidable to each other and constitute the sliding portion. An inner circumference side 12a of the sleeve 12 and a second pivot portion 10e of the main axis 10 are in a relation to be slidable to each other and constitute the sliding portion. More specifically, the sleeve 12 is accommodated inside the frame bearing 4, and the inner circumference of the frame bearing 4 and the outer circumference of the sleeve 12 are adhered to each other through lubricating oil to constitute a main bearing portion. The main axis 10 is inserted inside the sleeve 12, and the inner circumference side 12a inside the sleeve 12 and the second pivot portion 10e of the main axis 10 are adhered to each other through lubricating oil. The second pivot portion 10e is projected from the cylindrical surface in an approximately circular shape or an approximately spherical shape.

For the inner circumferential surface of the frame bearing 4, a non-metal bearing containing PTFE, POM, carbon, etc., as the main ingredients is used. The sleeve 12 is formed by high-hardness iron metal such as sintering or alloy tool steel. However, the surface of the sleeve 12 including the outer circumference or the inner circumferential surface 12a of the sleeve 12 is subjected to coating by any one of DLC, DLC-Si, CrN, TiN, TiCN, WCC, VC, etc., or film formation treatment of any one of a manganese phosphate film, a molybdenum disulfide film, etc. The second pivot portion 10e of the main axis 10 is formed by iron metal such as cast iron or alloy steel for machine structural use, which is the same material as that of the main axis 10. However, the surface of the main axis 10 including the second pivot portion 10e of the main axis 10 is subjected to coating of any one of DLC, DLC-Si, CrN, TiN, TiCN, WCC, VC, etc., or film formation treatment of any one of a manganese phosphate film, a molybdenum disulfide film, etc.

Next, the operation of the scroll compressor according to Embodiment 1 will be described. When a power supply is applied to the electric motor stator 9, the main axis 10 is rotated and driven by the electric motor rotor 8. Then, the rotational force is transmitted to the swing bearing 5 through the slider 11 accommodating the decentrated slider portion 10a, and then transmitted to the swing scroll 2d therefrom. During the operation, the swing scroll 2 swings while the rotation being suppressed by the Oldham ring 7 that moves back and forth in the Oldham grooves 2f of the swing scroll 2 and the Oldham grooves 3f of the frame 3.

The frame 3 having the main bearing 4 that supports the rotation of the main axis 10 and the sub-frame 15 having, at the center, the bearing storage portion 15a to which the outer ring of the ball bearing 16 is press-fitted are fixed in the sealed container 20. However, the axis core shift of the main bearing 4 and the ball bearing 16 arises due to the accuracy variation during the fixation or the accuracy variation of each component. Moreover, bending of the main axis 10 is also added, and thus the main bearing 4 and the main axis 10 and the ball bearing 16 and the main axis 10 are not always parallel. Thus, here, in order to make the slide surface in the main bearing 4 parallel, the sleeve 12 is accommodated between the main axis 10 and the main bearing 4. When the axis core shift of the main bearing 4 and the ball bearing 16 arises, the main axis 10 is inclined to the main bearing 4. However, when the second pivot portion 10e contacts the inner circumferential surface of the sleeve 12 to absorb the inclination, the outer circumference of the sleeve 12 can always slide in parallel to the main bearing 4.

The centrifugal force generates in the swing scroll 2, and the swing scroll 2 slides in a slidable range between the slider axis 10a of the main axis 10 and the slide surface 11a in the slider 11. Then, the lap portion 2a of the swing scroll 2 and the lap portion 1a of the fixed scroll 1 contact each other to constitute the compression chamber 23. The load of the centrifugal force of the swing scroll 2 and the load generating in the radial direction so as to compress the refrigerant are added to the decentrated slider portion 10a of the main axis 10 to bend the decentrated slider portion 10a. Thus, the decentrated slider portion 10a is not always parallel to the inside of the swing bearing 5 provided at the center of the back surface opposite to the side of the panel 2b of the swing scroll 2 on which the lap portion 2a is formed. Thus, here, in order to make the slide surface in the swing bearing 5 parallel, the slider 11 is accommodated between the decentrated slider portion 10a of the main axis 10 and the swing bearing 5. When the decentrated slider portion 10a bends, the decentrated slider portion 10a of the main axis 10 inclines to the swing bearing 5. However, when the first pivot portion 10d contacts the slider surface 11a of the slider 11 to absorb the inclination, the outer circumference of the slider 11 can always slide in parallel to the swing bearing 5.

The refrigerant to be compressed by the scroll compressor is a refrigerant which is a halogenated hydrocarbon or a hydrocarbon each having a carbon double bond in the composition thereof or a mixture containing thereof. The refrigerant is inhaled from the inhalation pipe 21 to the sealed container 20 to enter the compression chamber 23 formed by the lap portion 2a of the swing scroll 2 and the lap portion 1a of the fixed scroll 1 from an inhalation port 3a of the frame 3.

The compression chamber 23 moves to the center of the swing scroll 2 by the swing movement of the swing scroll 2, and is compressed by further reducing the volume thereof. During the operation, the load, by which the fixed scroll 1 and the swing scroll 2 separate from each other in the axis direction acts by the compressed refrigerant. However, the load is supported by a bearing constituted by the thrust bearing portion 2h on the back surface of the panel 2b of the swing scroll 2d and the thrust plate 6. The compressed refrigerant passes through a discharge port 1f of the fixed scroll 1, pushes to open a discharge valve 26, passes through a high-pressure portion in the sealed container 20, and is discharged from the sealed container 20 through a discharge pipe 22.

In a series of the above-described movements, the following elements slide to each other and constitute the sliding portion:
(a) the thrust bearing portion 2h of the swing scroll 2 and the slide surface 6a of the thrust plate 6,
(b) the lap portion 2a of the swing scroll 2 and the lap portion 1a of the fixed scroll 1,
(c) the seal 24 provided at the tip face of the lap portion 1a of the fixed scroll 1 and the bottom land 2e at the side of the lap portion 2a of the mirror panel 2b of the swing scroll 2,
(d) the seal 25 provided at the tip face of the lap portion 2a of the swing scroll 2 and the bottom land 1e at the side of the lap portion 1a of the panel 1b of the fixed scroll 1,
(e) the Oldham grooves 2f provided in the back face opposite to the side where the lap portion 2a of the panel 2b of the swing scroll 2 is formed and the upper convex portions 7a that are the keys of the Oldham ring 7,
(f) the Oldham grooves 3f provided near the main bearing 4 of the frame 3 and the lower convex portions 7b that are the keys of the Oldham ring 7,
(g) the inner circumference of the swing bearing 5 provided at the center of the back surface opposite to the side where the lap portion 2a of the panel 2b of the swing scroll 2 is formed and the outer circumference of the slider 11,
(h) the first pivot portion 10d of the decentrated slider axis 10a to which the slider 11, which is decentrated with respect to the rotation center of the main axis 10 and drives the swing axis, is mounted and the slide surface 11a of the slider 11,
(i) the inner circumference of the frame bearing 4 provided at the center of the frame 3 and the outer circumference of the sleeve 12 that supports the rotation of the main axis 10, and
(j) the inner circumference of the sleeve 12 and the second pivot portion 10e of the main axis 10.

The sliding portions of the scroll compressor according to Embodiment 1 are collectively shown in Table 1. In Table 1, the name of each of the two components (Component 1, Component 2) that constitute the sliding portions and base materials of the components are shown and performing the surface treatment (represented by coating) or replacing by ceramic materials or resin described above to the components is clearly denoted by the asterisk(*).

TABLE 1

| | | | Examples | | |
|---|---|---|---|---|---|
| Name | Portion | Base material | Coating | Ceramic | Resin |
| Sliding portion | | | | | |
| Component 1 | | | | | |
| Swing scroll | Thrust bearing portion | Iron base•Aluminum base | * | * | |
| | Lap portion surface | Iron base•Aluminum base | * | * | |
| | Bottom land | Iron base•Aluminum base | * | * | |
| | Oldham groove | Iron base•Aluminum base | * | * | * |
| | Swing bearing | Iron base•Aluminum base | * | * | * |
| Fixed scroll | Lap portion surface | Iron base•Aluminum base | * | * | |
| | Bottom land | Iron base•Aluminum base | * | * | |
| Frame | Oldham groove | Iron base•Aluminum base | * | * | * |
| | Frame bearing | Iron base•Aluminum base | * | * | * |
| Oldham ring | Key portion | Iron base•Aluminum base | * | * | * |
| | Key portion | Iron base•Aluminum base | * | * | * |
| Slider | Outer circumference | Iron base•Aluminum base | * | * | |
| | Slide surface | Iron base•Aluminum base | * | * | |
| Sleeve | Outer circumference | Iron base•Aluminum base | * | * | |
| | Inner circumference | Iron base•Aluminum base | * | * | |
| Thrust plate | Thrust surface | Iron base•Aluminum base | * | * | |
| Main axis | First pivot portion | Iron base•Aluminum base | * | * | |
| | Second pivot portion | Iron base•Aluminum base | * | * | |
| Component 2 | | | | | |
| Thrust plate | Thrust surface | Iron base•Aluminum base | * | * | |
| Fixed scroll | Lap portion surface | Iron base•Aluminum base | * | * | |
| Seal | Sliding surface | Resin (PPS, LCP, etc.) | | | |
| Oldham ring | Key portion | Iron base•Aluminum base | * | * | * |
| Slider | Outer circumference | Iron base•Aluminum base | * | * | |
| Swing scroll | Lap portion surface | Iron base•Aluminum base | * | * | |
| Seal | Sliding surface | Resin (PPS, LCP, etc.) | | | |
| Oldham ring | Key portion | Iron base•Aluminum base | * | * | * |
| Sleeve | Outer circumference | Iron base•Aluminum base | * | * | |
| Swing scroll | Oldham groove | Iron base•Aluminum base | * | * | * |
| Frame | Oldham groove | Iron base•Aluminum base | * | * | * |
| Swing scroll | Swing bearing | Iron base•Aluminum base | | * | * |
| Main axis | First pivot portion | Iron base•Aluminum base | * | * | |
| Frame | Frame bearing | Iron base•Aluminum base | | * | * |

TABLE 1-continued

| | | | Examples | | |
|---|---|---|---|---|---|
| Name | Portion | Base material | Coating | Ceramic | Resin |
| Main axis | Second pivot portion | Iron base•Aluminum base | * | * | |
| Swing scroll | Thrust bearing portion | Iron base•Aluminum base | * | * | |
| Slider | Slide surface | Iron base•Aluminum base | * | * | |
| Sleeve | Inner circumference | Iron base•Aluminum base | * | * | |

Sliding portion

To these sliding portions, lubricating oil of the oil sump 19 at the lower end of the sealed container 20 is supplied. More specifically, the oil pump 18 is driven by the pump axis 10b by the rotation of the main axis 10, and the lubricating oil of the oil sump 19 is supplied to the above-mentioned sliding portions through the oil hole 10c penetrating from the lower end to the upper end of the main axis 10. The temperature of these sliding portions becomes high. Thus, the atmosphere thereof becomes the same atmosphere as that of the refrigerant having a relatively low temperature inhaled into the sealed container 20, and thus the sliding portions are cooled.

The scroll compressor according to Embodiment 1 uses, as a refrigerant, the refrigerant which is a halogenated hydrocarbon or a hydrocarbon each having a carbon double bond in the composition thereof or a mixture containing thereof. However, the sliding surfaces of the sliding portions, whose temperature is likely to become high, are subjected to coating, film formation, or replacement to non-metal materials, so that the iron or aluminum metal that can serve as a metal catalyst that promotes the chemical reaction of the refrigerant is not directly exposed to the sliding surfaces of the sliding portions. Therefore, the decomposition or polymerization of the refrigerant is suppressed, and thus the generation of sludge is suppressed to suppress troubles of the compressor or blocking in a refrigeration circuit, which allows obtaining reliability over a long period of time of the compressor.

In the scroll compressor of embodiments of the invention, POE (polyolester), PVE (polyvinyl ether), PAG (polalkylene glycol), PAO (poly alpha olefin), AB (alkylbenzene), MO (mineral oil), etc., which have been generally used heretofore, are used as the lubricating oil. The viscosity of the lubricating oils needs to be determined so that sufficient lubrication can be achieved and the performance of the scroll compressor does not decrease. The kinetic viscosity (at 40° C.) is preferably adjusted to about 5 to 300 [cSt].

Embodiment 2

In Embodiment 2, a slider plate is disposed inside the slider 11 and a first pivot portion and a slider plate are adhered to each other through lubricating oil and constitute a sliding portion in place of using the slide surface 11a inside the slider 11 as an adhesion surface. The other structure is the same as that of Embodiment 1 as shown in FIG. 7.

Figure 8:
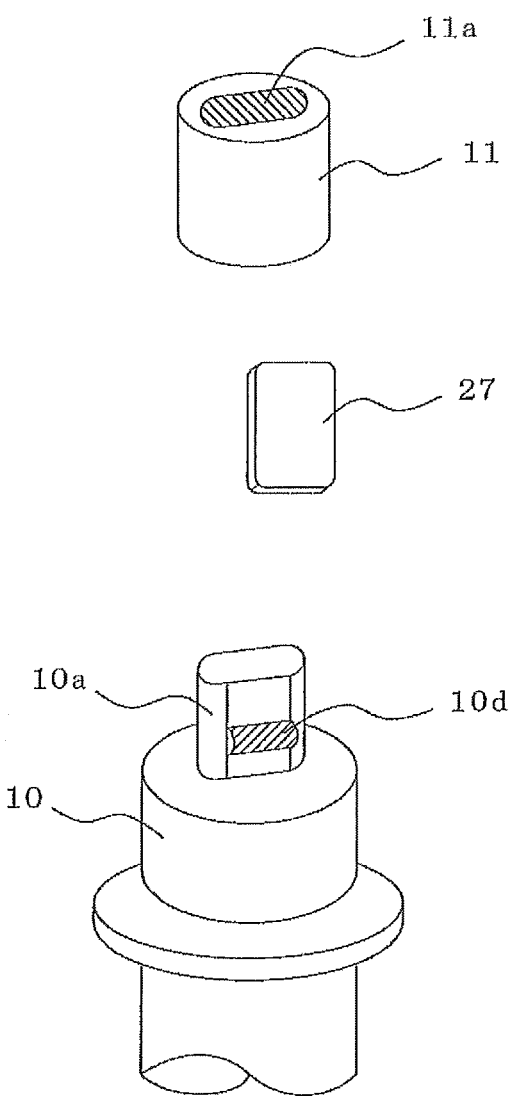
FIG. 8 is an explanatory view of a sliding portion containing a slider plate that enters a slider and a main axis of a scroll compressor of Embodiment 2 of the invention.
Figure 9:
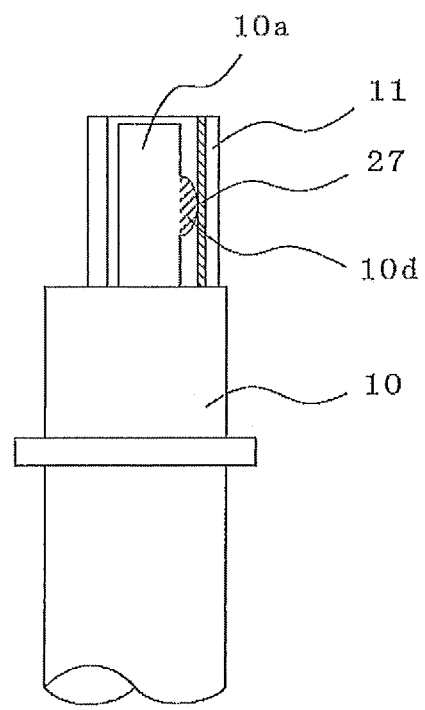
FIG. 9 is an explanatory view showing the sliding state of a sliding portion to which each element of FIG. 8 is attached.

FIG. 8 is an explanatory view of a sliding portion containing a slider plate 27 that enters the slider 11 and the main axis 10 of a scroll compressor of Embodiment 2 of the invention. FIG. 9 is an explanatory view showing the sliding state of a sliding portion to which each element of FIG. 8 is attached. The slider 11 has the slider plate 27 thereinside and the decentrated slider axis 10a of the main axis 10 is inserted into the slider 11. To the slider plate 27, the first pivot portion 10d provided substantially at the center of the plane portion of the decentrated slider axis 10a of the main axis 10 is adhered through lubricating oil.

The slider plate 27 is formed with iron metal, such as stainless steel, alloy tool steel, or spring steel. However, the surface of the slider plate 27 is subjected to coating of any one of DLC, DLC-Si, CrN, TiN, TiCN, WCC, VC, etc., or film formation treatment of any one of a manganese phosphate film, a molybdenum disulfide film, etc.

The first pivot portion 10d is formed with iron metal, such as cast iron or alloy steel for machine structures, which is the same material as that of the main axis 10. However, the surface of the main axis 10 including the first pivot portion 10d provided substantially at the center of the plane portion of the decentrated slider axis 10a of the main axis 10 is subjected to coating of any one of DLC, DLC-Si, CrN, TiN, TiCN, WCC, VC, etc., or film formation treatment of any one of a manganese phosphate film, a molybdenum disulfide film, etc.

The sliding portions of the scroll compressor according to Embodiment 2 are shown in Table 2. In Table 2, the name of each of the two components (Component 1, Component 2) that constitute the sliding portions and base materials of the components are shown and performing the surface treatment (represented as coating) or replacement to ceramic materials or resins described above to the components is clearly shown by the asterisk(*).

TABLE 2

Sliding portion

| | | | Examples | | |
|---|---|---|---|---|---|
| Name | Portion | Base material | Coating | Ceramic | Resin |
| Component 1 | | | | | |
| Swing scroll | Thrust bearing portion | Iron base•Aluminum base | * | * | |
| | Lap portion surface | Iron base•Aluminum base | * | * | |
| | Bottom land | Iron base•Aluminum base | * | * | |
| | Oldham groove | Iron base•Aluminum base | * | * | * |
| | Swing bearing | Iron base•Aluminum base | * | * | * |

TABLE 2-continued

Sliding portion

| Name | Portion | Base material | Coating | Ceramic | Resin |
|---|---|---|---|---|---|
| Fixed scroll | Lap portion surface | Iron base•Aluminum base | * | * | |
| | Bottom land | Iron base•Aluminum base | * | * | |
| Frame | Oldham groove | Iron base•Aluminum base | * | * | * |
| | Frame bearing | Iron base•Aluminum base | * | * | * |
| Oldham ring | Key portion | Iron base•Aluminum base | * | * | * |
| | Key portion | Iron base•Aluminum base | * | * | * |
| Slider | Outer circumference | Iron base•Aluminum base | * | * | |
| | Slide surface | Iron base•Aluminum base | * | * | |
| Sleeve | Outer circumference | Iron base•Aluminum base | * | * | |
| | Inner circumference | Iron base•Aluminum base | * | * | |
| Thrust plate | Thrust surface | Iron base•Aluminum base | * | * | |
| Slider plate | Surface | Iron base•Aluminum base | * | * | |
| | Surface | Iron base•Aluminum base | * | * | |
| Main axis | First pivot portion | Iron base•Aluminum base | * | * | |
| | Second pivot portion | Iron base•Aluminum base | * | * | |
| Component 2 | | | | | |
| Thrust plate | Thrust surface | Iron base•Aluminum base | * | * | |
| Fixed scroll | Lap portion surface | Iron base•Aluminum base | * | * | |
| Seal | Sliding surface | Resin (PPS, LCP, etc.) | | | |
| Oldham ring | Key portion | Iron base•Aluminum base | * | * | * |
| Slider | Outer circumference | Iron base•Aluminum base | * | * | |
| Swing scroll | Lap portion surface | Iron base•Aluminum base | * | * | |
| Seal | Sliding surface | Resin (PPS, LCP, etc.) | | | |
| Oldham ring | Key portion | Iron base•Aluminum base | * | * | * |
| Sleeve | Outer circumference | Iron base•Aluminum base | * | * | |
| Swing scroll | Oldham groove | Iron base•Aluminum base | * | * | * |
| Frame | Oldham groove | Iron base•Aluminum base | * | * | * |
| Swing scroll | Swing bearing | Iron base•Aluminum base | * | * | * |
| Slider plate | Surface | Iron base•Aluminum base | * | * | |
| Frame | Frame bearing | Iron base•Aluminum base | * | * | * |
| Main axis | Second pivot portion | Iron base•Aluminum base | * | * | |
| Swing scroll | Thrust bearing portion | Iron base•Aluminum base | * | * | |
| Slider | Slide surface | Iron base•Aluminum base | * | * | |
| Main axis | First pivot portion | Iron base•Aluminum base | * | * | |
| Slider plate | Surface | Iron base•Aluminum base | * | * | |
| Sleeve | Inner circumference | Iron base•Aluminum base | * | * | |

The scroll compressor according to Embodiment 2 also uses, as a refrigerant, the refrigerant which is a halogenated hydrocarbon or a hydrocarbon each having a carbon double bond in the composition thereof or a mixture containing thereof. However, the sliding surfaces of the sliding portions, whose temperature is likely to become high, are subjected to coating, film formation, or replacement to non-metal materials, so that the iron or aluminum metal that can serve as a metal catalyst that promotes the chemical reaction of the refrigerant is not directly exposed to the sliding surfaces of the sliding portions. Therefore, the decomposition or polymerization of the refrigerant is suppressed, and thus the generation of sludge is suppressed to suppress troubles of the compressor or blocking in a refrigeration circuit, which allows obtaining reliability over a long period of time of the compressor.

In addition, the following characteristic effects are demonstrated with the structure of Embodiment 2. More specifically, the slider plate 27 has a shape in which the hardness is relatively easily secured. Thus, compared with forming the slide surface 11a on the slider 11, the cost for securing hardness required for suppressing wear can be reduced. Moreover, the wear of the slide surface 11a can be suppressed without the application of a high load to the slide surface 11a of the slider 11. Thus, a high-reliability scroll compressor can be obtained at a low cost.

Embodiment 3

Figure 10:
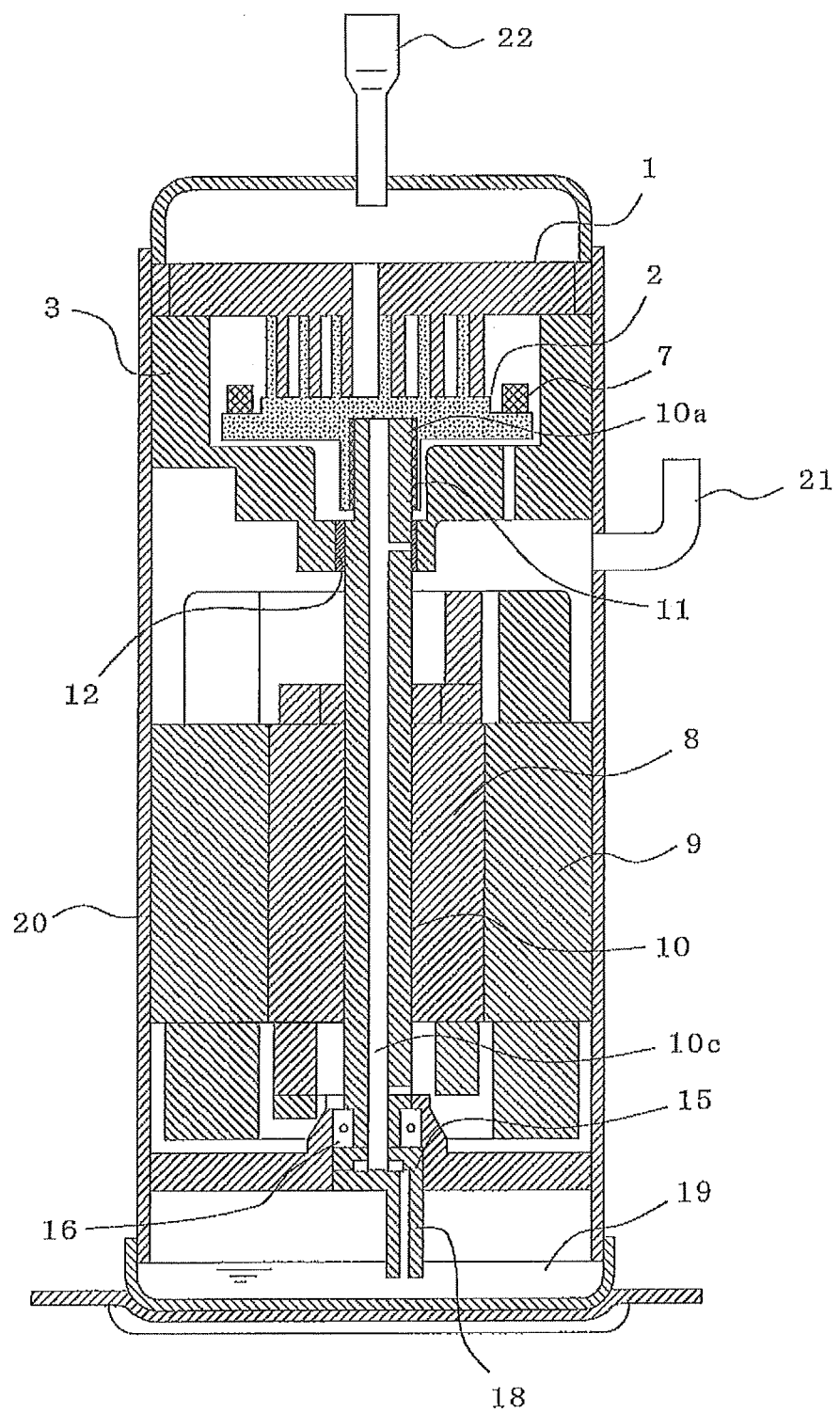
FIG. 10 is a cross sectional view showing the inside of a scroll compressor in Embodiment 3 of the invention.
Figure 11:
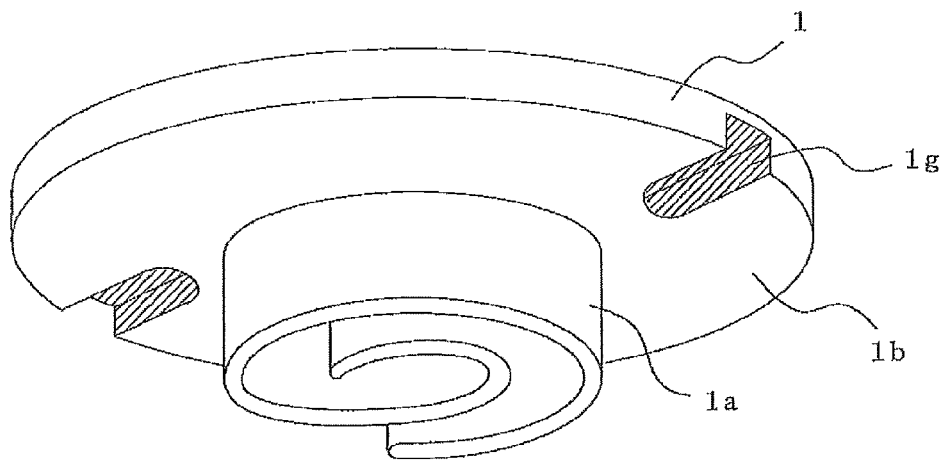
FIG. 11 is an explanatory view of a sliding portion containing a swing scroll and an Oldham ring and a fixed scroll and an Oldham ring in the compressor of the aspect of FIG. 10.
Figure 11:
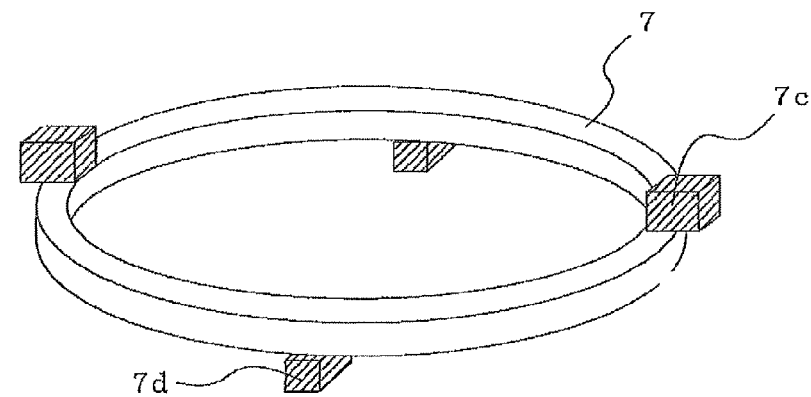
Figure 11:
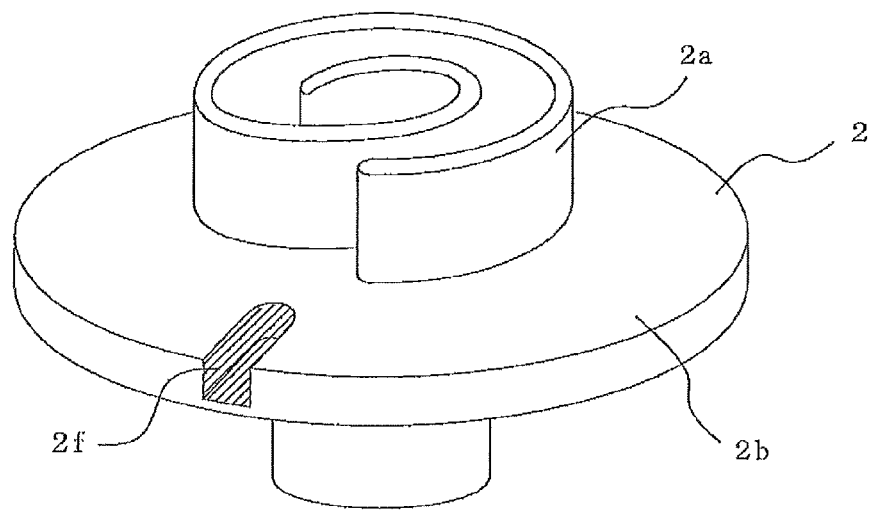

FIG. 10 is a cross sectional view showing the inside of a scroll compressor in Embodiment 3 of the invention. FIG. 11 is an explanatory view of a sliding portion containing the swing scroll 2 and the Oldham ring 7 and the fixed scroll 1 and the Oldham ring 7 in the compressor of the aspect of FIG. 10.

Embodiment 1 or Embodiment 2 describes the scroll compressor in which the Oldham ring 7 is disposed between the swing scroll 2 and the frame 3. In contrast, Embodiment 3 describes a scroll compressor in which the Oldham ring 7 is disposed between the swing scroll 2 and the fixed scroll 1 and the thrust bearing portion 2h of the swing scroll 2 has a thrust bearing member 2g. Here, portions different from Embodiments 1 and 2 will be mainly described.

The swing scroll 2 has the Oldham grooves 2f for accommodating and sliding the lower convex portions 7d that are keys of the Oldham ring 7 at the side of the panel 2b on which the lap portion 2a is formed. The fixed scroll 1 has the Oldham grooves 1g for accommodating and sliding the upper convex portions 7d that are keys of the Oldham ring 7 at the side of the panel 2b on which the lap portion 2a is formed. Thus, the swing scroll 2 swings relative to the fixed scroll 1. In this case, the Oldham grooves 2f of the swing scroll 2 and the lower convex portions 7d of the Oldham ring 7 are slidable to each other and constitute the sliding portion. Moreover, the Oldham grooves 1g of the fixed scroll 1 and the upper convex portion 7c of the Oldham ring 7 are slidable to each other and constitute the sliding portion.

The Oldham grooves 2f of the swing scroll 2 are formed with iron metal, such as cast iron, or an Al—Si alloy metal, which is the same material as that of the swing scroll 2. However, the surface of the swing scroll 2 including the Oldham grooves 2f of the swing scroll 2d is subjected to coating of any one of DLC, DLC-Si, CrN, TiN, TiCN, WCC, VC, etc., or film formation treatment of any one of a manganese phosphate film, a molybdenum disulfide film, etc.

The Oldham grooves 1g of the fixed scroll 1 are formed with iron metal, such as cast iron, which is the same material as that of the fixed scroll 1. However, the surface of the fixed scroll 1 including the Oldham grooves 1g of the fixed scroll 1 is subjected to coating of any one of DLC, DLC-Si, CrN, TiN, TiCN, WCC, VC, etc., or film formation treatment of any one of a manganese phosphate film, a molybdenum disulfide film, etc.

The upper and lower convex portions 7c and 7d of the Oldham ring 7 are formed with high-rigidity and lightweight materials, such as iron metal, such as sintering, or an Al—Si alloy metal, which is the same material as that of the Oldham ring 7. However, the surface of the Oldham ring 7 including the respective convex portions 7c and 7d is subjected to coating of any one of DLC, DLC-Si, CrN, TiN, TiCN, WCC, VC, etc., or film formation treatment of any one of a manganese phosphate film, a molybdenum disulfide film, etc.

Figure 12:
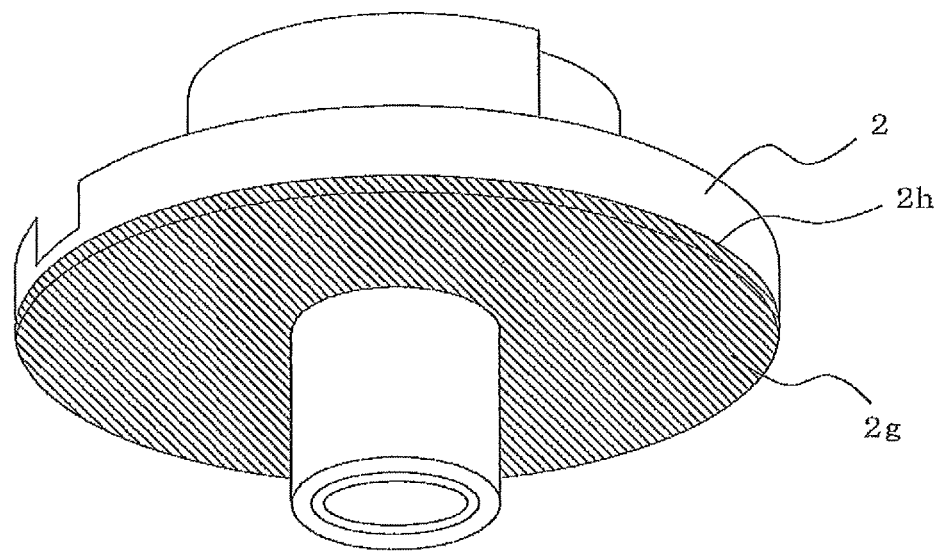
FIG. 12 is an explanatory view of the sliding portion containing a thrust bearing member provided at the swing scroll and the thrust plate in the compressor of the aspect of FIG. 10.
Figure 12:
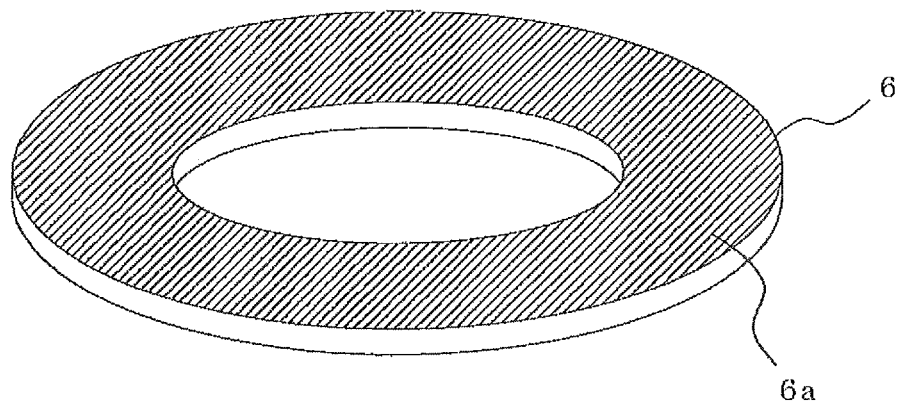

FIG. 12 is an explanatory view of a sliding portion constituted by a thrust bearing member 2g provided at the swing scroll and the thrust plate 6 in the compressor of the aspect of FIG. 10.

The thrust bearing member 2g provided at the swing scroll 2 and the thrust plate 6 are in a relation to be slidable to each other and constitute the sliding portion. In Embodiment 3, the Oldham grooves 2f are disposed at the same side where the lap portion 2a of the panel 2b of the swing scroll 2 is formed. Therefore, a big thrust bearing portion 2h can be formed at the back surface of the swing scroll 2 opposite to the side where the lap portion 2a of the panel 2b of the swing scroll 2 is formed, so that the thrust bearing member 2g is provided. To a sliding surface 6a of the thrust plate 6, the thrust bearing member 2g is adhered through lubricating oil. The sliding surface 6a of the thrust plate 6 and the thrust bearing member 2g of the swing scroll 2 constitute the thrust bearing.

The swing scroll 2 is formed by iron metal such as cast iron or an Al—Si alloy metal. In contrast, for the thrust bearing member 2g, a non-metal bearing containing PTFE, POM, carbon, etc., as the main ingredients is used. The thrust plate 6 is formed by iron metal, such as stainless steel, alloy tool steel, and spring steel. However, the surface of the thrust plate 6 including the sliding surfaces 6a is subjected to coating of any one of DLC, DLC-Si CrN, TiN, TiCN, WCC, VC, etc., or film formation treatment of any one of a manganese phosphate film, a molybdenum disulfide film, etc.

The sliding portions of the scroll compressor according to Embodiment 3 are shown in Table 3. In Table 3, the name of each of the two components (Component 1, Component 2) that constitute the sliding portions and base materials of the components are shown and performing the surface treatment (represented as coating) or replacement to ceramic materials or resins described above to the components is clearly shown by the asterisk(*).

TABLE 3

| | | | Examples | | |
|---|---|---|---|---|---|
| Name | Portion | Base material | Coating | Ceramic | Resin |
| Sliding portion | | | | | |
| Component 1 | | | | | |
| Swing scroll | Lap portion surface | Iron base•Aluminum base | * | * | |
| | Bottom land | Iron base•Aluminum base | * | * | |
| | Oldham groove | Iron base•Aluminum base | * | * | * |
| | Swing bearing | Iron base•Aluminum base | * | * | * |
| | Thrust bearing member | Iron base•Aluminum base | * | * | * |
| Fixed scroll | Lap portion surface | Iron base•Aluminum base | * | * | |
| | Bottom land | Iron base•Aluminum base | * | * | |
| | Oldham groove | Iron base•Aluminum base | * | * | * |
| Frame | Frame bearing | Iron base•Aluminum base | * | * | * |
| Oldham ring | Key portion | Iron base•Aluminum base | * | * | * |
| | Key portion | Iron base•Aluminum base | * | * | * |
| Slider | Outer circumference | Iron base•Aluminum base | * | * | |
| | Slide surface | Iron base•Aluminum base | * | * | |
| Sleeve | Outer circumference | Iron base•Aluminum base | * | * | |
| | Inner circumference | Iron base•Aluminum base | * | * | |
| Thrust plate | Thrust surface | Iron base•Aluminum base | * | * | |
| Slider plate | Surface | Iron base•Aluminum base | * | * | |
| | Surface | Iron base•Aluminum base | * | * | |
| Main axis | First pivot portion | Iron base•Aluminum base | * | * | |
| | Second pivot portion | Iron base•Aluminum base | * | * | |
| Component 2 | | | | | |
| Fixed scroll | Lap portion surface | Iron base•Aluminum base | * | * | |
| Seal | Sliding surface | Resin (PPS, LCP, etc.) | | | |
| Oldham ring | Key portion | Iron base•Aluminum base | * | * | |

TABLE 3-continued

Sliding portion

| Name | Portion | Base material | Examples | | |
|---|---|---|---|---|---|
| | | | Coating | Ceramic | Resin |
| Slider | Outer circumference | Iron base•Aluminum base | * | * | |
| Thrust plate | Thrust surface | Iron base•Aluminum base | * | * | * |
| Swing scroll | Lap portion surface | Iron base•Aluminum base | * | * | |
| Seal | Sliding surface | Resin (PPS, LCP, etc.) | | | |
| Oldham ring | Key portion | Iron base•Aluminum base | * | * | * |
| Sleeve | Outer circumference | Iron base•Aluminum base | * | * | |
| Swing scroll | Oldham groove | Iron base•Aluminum base | * | * | * |
| Fixed scroll | Oldham groove | Iron base•Aluminum base | * | * | * |
| Swing scroll | Swing bearing | Iron base•Aluminum base | * | * | * |
| Slider plate | Surface | Iron base•Aluminum base | * | * | |
| Frame | Frame bearing | Iron base•Aluminum base | * | * | * |
| Main axis | Second pivot portion | Iron base•Aluminum base | * | * | |
| Swing scroll | Thrust bearing member | Iron base•Aluminum base | * | * | * |
| Slider | Slide surface | Iron base•Aluminum base | * | * | |
| Main axis | First pivot portion | Iron base•Aluminum base | * | * | |
| Slider plate | Surface | Iron base•Aluminum base | * | * | |
| Sleeve | Inner circumference | Iron base•Aluminum base | * | * | |

The scroll compressor according to Embodiment 3 also uses, as a refrigerant, the refrigerant which is a halogenated hydrocarbon or a hydrocarbon each having a carbon double bond in the composition thereof or a mixture containing thereof. However, the sliding surfaces of the sliding portions, whose temperature is likely to become high, are subjected to coating, film formation, or replacement to non-metal materials, so that the iron or aluminum metal that can serve as a metal catalyst that promotes the chemical reaction of the refrigerant is not directly exposed to the sliding surfaces of the sliding portions. Therefore, the decomposition or polymerization of the refrigerant is suppressed, and thus the generation of sludge is suppressed to suppress troubles of the compressor or blocking in a refrigeration circuit, which allows obtaining reliability over a long period of time of the compressor.

In addition, by structuring as in Embodiment 3, when the swing scroll 2 swings, the phase of the fixed scroll 1 and the swing scroll 2 can be directly determined by the Oldham ring 7 without through the frame 3. Therefore, the phase when the fixed scroll 1 and the swing scroll 2 swing can be held with higher accuracy and the leak from the compression chamber 23 formed by the lap portion 2a of the swing scroll 2 and the lap portion 1a of the fixed scroll 1 is reduced, thereby obtaining a scroll compressor having higher performance. Moreover, since the thrust bearing portion 2h of the swing scroll 2 is enlarged and the thrust bearing member 2g is disposed thereto, the sliding properties of the thrust bearing increase, and thus the performance can be improved or the reliability can be increased due to a reduction in the sliding loss.

Embodiment 4

Figure 13:
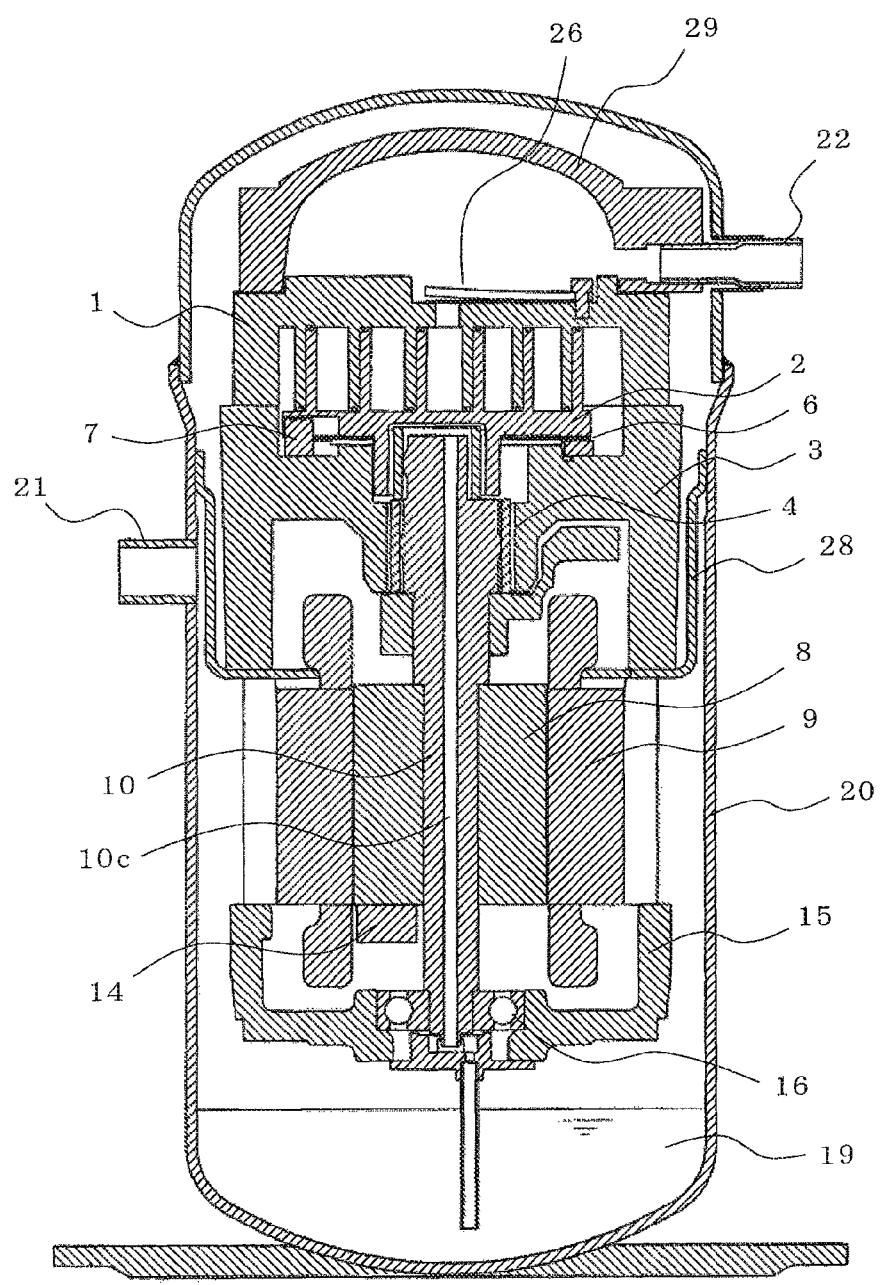
FIG. 13 is a structure diagram showing the structure of a scroll compressor according to Embodiment 4 of the invention.
Figure 14:
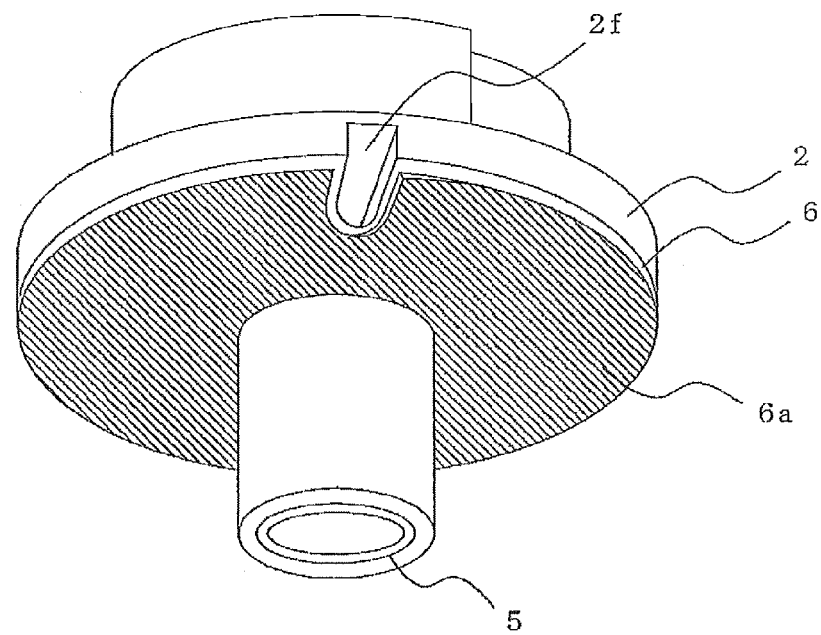
FIG. 14 is an explanatory view of a sliding portion containing a thrust plate provided at a swing scroll and a thrust bearing member provided at a frame in the compressor of the aspect of FIG. 13.
Figure 14:
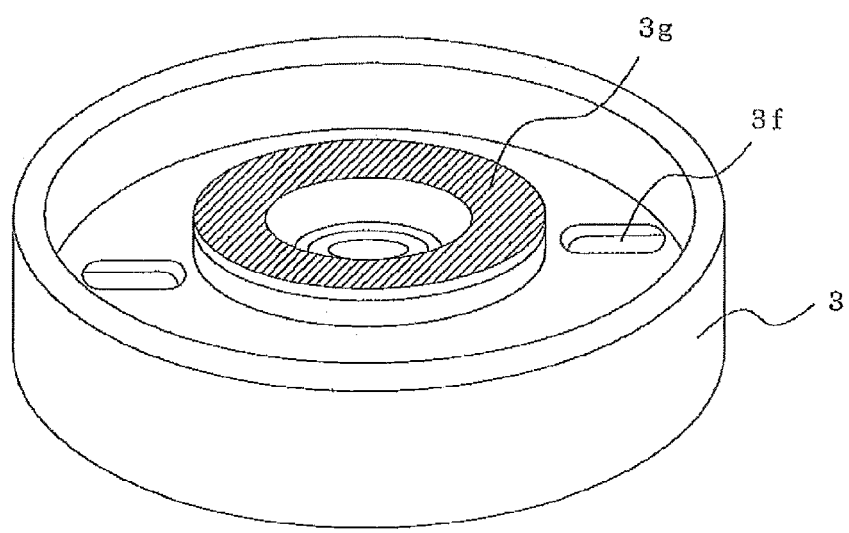

FIG. 13 is a structure diagram showing the structure of a scroll compressor according to Embodiment 4 of the invention. FIG. 14 is an explanatory view of the sliding portion containing the thrust plate 6 provided at the swing scroll 2 and a thrust bearing member 3g provided at the frame 3 in the compressor of the aspect of FIG. 13.

The scroll compressor of Embodiment 4 is provided with the thrust plate 6 at the back surface of the swing scroll 2 opposite to the side of the panel 2b of the swing scroll 2 on which the lap portion 2a is formed and is provided with the thrust bearing member 3g at a thrust support portion of the frame 3. Here, portions different from Embodiments 1, 2, and 3 will be mainly described.

In the sealed container 20, a compression mechanism portion containing the fixed scroll 1, the swing scroll 2, the frame 3, etc., and an electric motor containing the electric motor stator 9 and the electric motor rotor 8 are fixed through a holder 28. At the back surface opposite to the side of the panel 2b of the swing scroll 2 on which the lap portion 2a is formed, the thrust plate 6 is provided and the thrust plate 6 and the thrust bearing member 3g provided at the thrust support portion of the frame 3 constitute the thrust bearing. Therefore, the thrust plate 6 and the thrust bearing member 3g are slidable to each other and constitute the sliding portion.

At the back surface opposite to the side of the panel 2b of the swing scroll 2 on which the lap portion 2a is formed, the Oldham grooves 2f for accommodating the upper convex portions that are keys of the Oldham ring 7 are provided. Therefore, the thrust plate 6 that is shaped in such a manner as to avoid the Oldham grooves 2f is stuck with an adhesive or a bolt. The thrust bearing member 3g is provided at the thrust support portion near the main bearing 4 of the frame 3.

The thrust plate 6 is formed with iron metal, such as stainless steel, alloy tool steel, or spring steel. However, the surface of the thrust plate 6 is subjected to coating of any one of DLC, DLC-Si, CrN, TiN, TiCN, WCC, VC, etc., or film formation treatment of any one of a manganese phosphate film, a molybdenum disulfide film, etc. The frame 3 is formed with iron metal, such as cast iron and, for the thrust bearing member 3g, a non-metal bearing containing PTFE, POM, carbon, etc., as the main ingredients is used.

The sliding portions of the scroll compressor according to Embodiment 4 are shown in Table 4. In Table 4, the name of each of the two components (Component 1, Component 2) that constitute the sliding portions and base materials of the components are shown and performing the surface treatment (represented as coating) or replacement to ceramic materials or resins described above to the components is clearly shown by the asterisk(*).

TABLE 4

Sliding portion

| Name | Portion | Base material | Examples Coating | Ceramic | Resin |
|---|---|---|---|---|---|
| Component 1 | | | | | |
| Swing scroll | Lap portion surface | Iron base•Aluminum base | * | * | |
| | Bottom land | Iron base•Aluminum base | * | * | |
| | Oldham groove | Iron base•Aluminum base | * | * | * |
| | Swing bearing | Iron base•Aluminum base | * | * | * |
| Fixed scroll | Lap portion surface | Iron base•Aluminum base | * | * | |
| | Bottom land | Iron base•Aluminum base | * | * | |
| Frame | Frame bearing | Iron base•Aluminum base | * | * | * |
| | Oldham groove | Iron base•Aluminum base | * | * | * |
| | Thrust bearing member | Iron base•Aluminum base | * | * | * |
| Oldham ring | Key portion | Iron base•Aluminum base | * | * | |
| | Key portion | Iron base•Aluminum base | * | * | |
| Slider | Outer circumference | Iron base•Aluminum base | * | * | |
| | Slide surface | Iron base•Aluminum base | * | * | |
| Sleeve | Outer circumference | Iron base•Aluminum base | * | * | |
| | Inner circumference | Iron base•Aluminum base | * | * | |
| Thrust plate | Thrust surface | Iron base•Aluminum base | * | * | |
| Slider plate | Surface | Iron base•Aluminum base | * | * | |
| | Surface | Iron base•Aluminum base | * | * | |
| Main axis | First pivot portion | Iron base•Aluminum base | * | * | |
| | Second pivot portion | Iron base•Aluminum base | * | * | |
| Component 2 | | | | | |
| Fixed scroll | Lap portion surface | Iron base•Aluminum base | * | * | |
| Seal | Sliding surface | Resin (PPS, LCP, etc.) | | | |
| Oldham ring | Key portion | Iron base•Aluminum base | * | * | |
| Slider | Outer circumference | Iron base•Aluminum base | * | * | |
| Swing scroll | Lap portion surface | Iron base•Aluminum base | * | * | |
| Seal | Sliding surface | Resin (PPS, LCP, etc.) | | | |
| Sleeve | Outer circumference | Iron base•Aluminum base | * | * | |
| Oldham ring | Key portion | Iron base•Aluminum base | * | * | |
| Thrust plate | Thrust surface | Iron base•Aluminum base | * | * | |
| Swing scroll | Oldham groove | Iron base•Aluminum base | * | * | * |
| Frame | Oldham groove | Iron base•Aluminum base | * | * | * |
| Swing scroll | Swing bearing | Iron base•Aluminum base | * | * | * |
| Slider plate | Surface | Iron base•Aluminum base | * | * | |
| Frame | Frame bearing | Iron base•Aluminum base | * | * | * |
| Main axis | Second pivot portion | Iron base•Aluminum base | * | * | |
| Frame | Thrust bearing member | Iron base•Aluminum base | * | * | * |
| Slider | Slide surface | Iron base•Aluminum base | * | * | |
| Main axis | First pivot portion | Iron base•Aluminum base | * | * | |
| Slider plate | Surface | Iron base•Aluminum base | * | * | |
| Sleeve | Inner circumference | Iron base•Aluminum base | * | * | |

The scroll compressor according to Embodiment 4 also uses, as a refrigerant, the refrigerant which is a halogenated hydrocarbon or a hydrocarbon each having a carbon double bond in the composition thereof or a mixture containing thereof. However, the sliding surfaces of the sliding portions, whose temperature is likely to become high, are subjected to coating, film formation, or replacement to non-metal materials, so that the iron or aluminum metal that can serve as a metal catalyst that promotes the chemical reaction of the refrigerant is not directly exposed to the sliding surfaces of the sliding portions. Therefore, the decomposition or polymerization of the refrigerant is suppressed, and thus the generation of sludge is suppressed to suppress troubles of the compressor or blocking in a refrigeration circuit, which allows obtaining reliability over a long period of time of the compressor.

In addition, by structuring as in Embodiment 4, the size of the thrust bearing member 3g can be reduced and the performance can be improved due to a reduction in the sliding loss or the amount of the bearing member, which is expensive, can be reduced while maintaining the sliding properties of the thrust bearing. Therefore, a high-reliability and high-performance scroll compressor can be obtained at a low cost.

Embodiment 5

Figure 15:
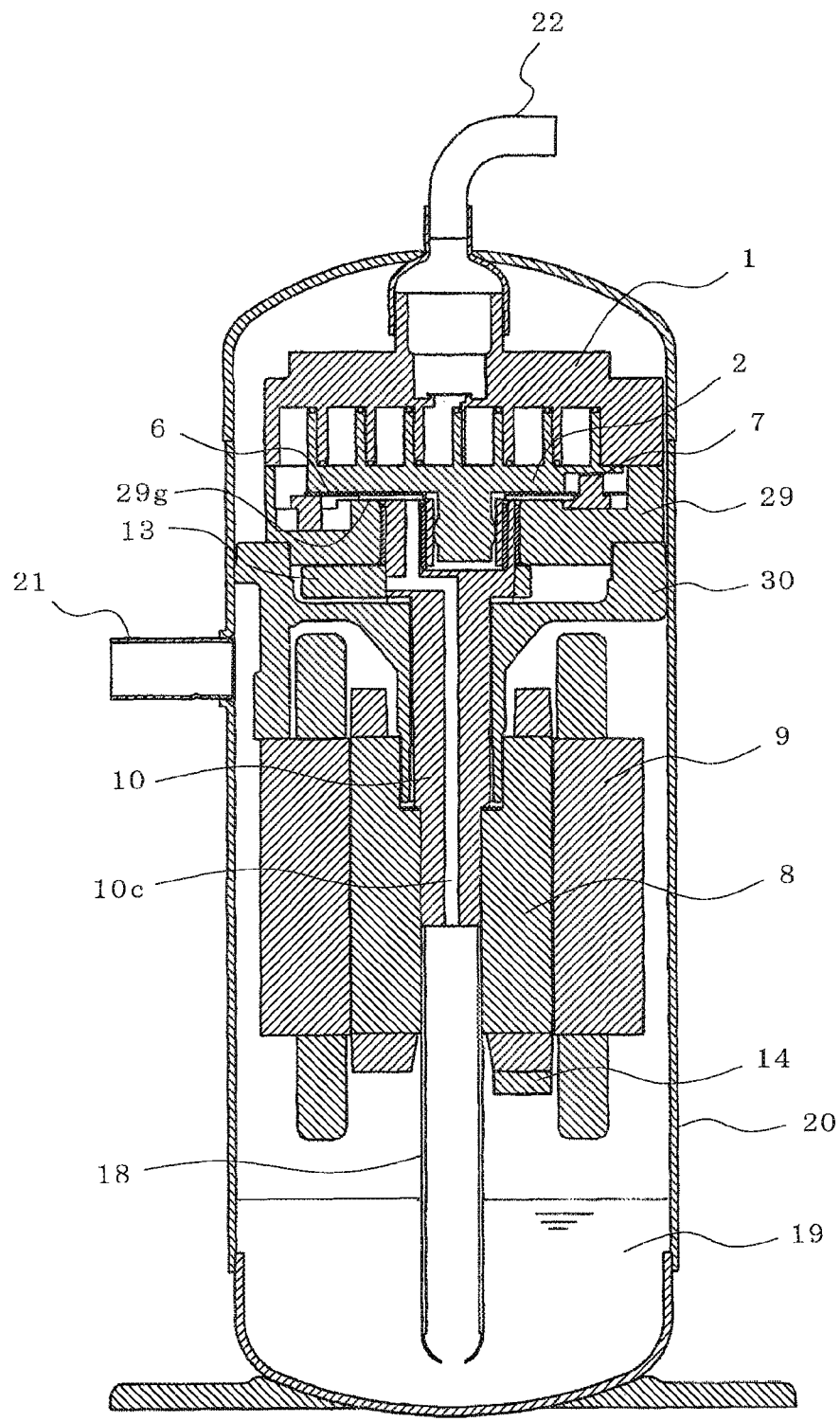
FIG. 15 is a structure diagram showing the structure of a scroll compressor according to Embodiment 5 of the invention.
Figure 16:
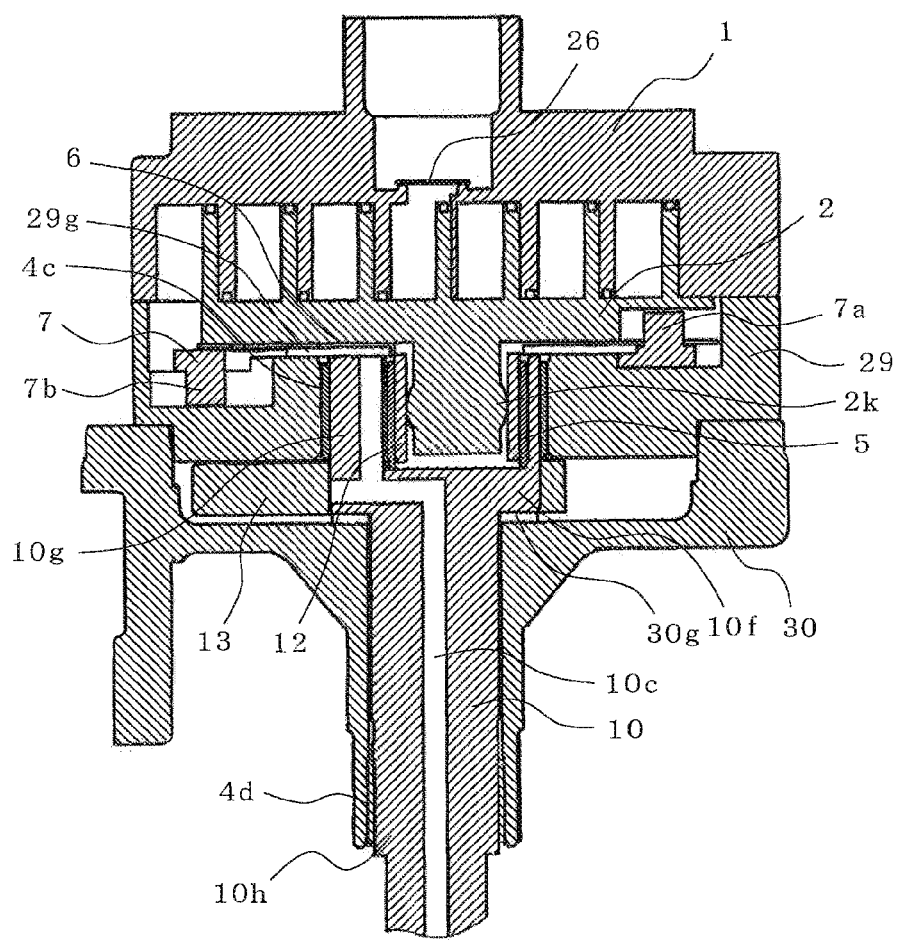
FIG. 16 is an explanatory view of a compression mechanism portion in the compressor of the aspect of FIG. 15.

FIG. 15 is a structure diagram showing the structure of a scroll compressor according to Embodiment 5 of the invention. FIG. 16 is an enlarged explanatory view of a compression mechanism portion in the compressor of the aspect of FIG. 15.

The scroll compressor of Embodiment 5 has an aspect in which the frame 3 of Embodiments 1 to 4 is divided into a first frame (also referred to as a frame A) 29 and a second frame (also referred to as a frame B) 30 and the sub-frame 15 of the axis lower portion is abolished. In the sealed container 20, a compression mechanism portion provided with the fixed scroll 1, the swing scroll 2, and the first frame 29 and an electric motor constituted by the electric motor stator 9 and the electric motor rotor 8 are fixed through the second frame 30. The swing bearing 5 is provided at the tip of the main axis 10 while being decentrated and a swing axis pivot portion 2k is provided at the center of the back face opposite to the lap portion 2a of the mirror panel 2b of the swing scroll 2. Here, portions different from Embodiments 1 to 4 will be mainly described.

The inside of the frame bearing 4c provided at the center of the first frame 29 and the outer circumference of a first outer circumferential portion 10g positioned at the upper end of the main axis 10 are adhered to each other through lubricating oil to constitute a main bearing portion A. They are slidable to each other and constitute the sliding portion. Moreover, the inside of the frame bearing 4 provided at the center of the second frame 30 and the outer circumference of a second outer circumferential portion 10h positioned substantially at the center of the main axis 10 are adhered to each other through lubricating oil to constitute a main bearing portion B. They are also slidable to each other and constitute the sliding portion. The self weight of the main axis 10 is supported by an axial thrust surface 10f of the main axis 10 and a secondary thrust bearing 30g of the second frame 30. The swing bearing 5 is embedded in the upper end portion of the main axis 10 at a position decentrated relative to the rotation center of the main axis 10. The swing bearing 5 accommodates the sleeve 12 and, into the sleeve 12, the swing axis pivot portion 2k provided at the center of the back surface opposite to the lap portion 2a of the panel 2b of the swing scroll 2 is inserted. To the inner circumferential surface inside the sleeve 12, the swing axis pivot portion 2k is adhered through lubricating oil. The swing axis pivot portion 2k is a portion projected from the cylindrical surface in an approximately circular shape or spherical shape.

The thrust plate 6 pasted, by adhesion, with a bolt, or the like, to the back surface of the side opposite to the side of the panel 2b of the swing scroll 2 on which the lap portion 2a is formed and a thrust bearing member (also referred to as a thrust metal) 29g provided at the thrust support portion near the frame bearing 4c of the first frame 29 constitute the thrust bearing. Therefore, the thrust plate 6 and the thrust bearing member 2g are slidable to each other and constitute the sliding portion.

Here, for the inner diameter of the frame bearing 4c and a frame bearing 4d and the surface of the secondary thrust bearing 30g, a non-metal bearing containing PTFE, PON, carbon, etc., as the main ingredients is used. The first outer circumferential portion 10g of the main axis 10, the second outer circumferential portion 10h, and the axial thrust surface 10f are formed with iron metal, such as iron, which is the same material as that of the main axis 10. However, the surface of the main axis 10 including the same is subjected to coating of any one of DLC, DLC-Si, CrN, TiN, TiCN, WCC, VC, etc., or film formation treatment of any one of a manganese phosphate film, a molybdenum disulfide film, etc.

The outer circumference and the inner circumferential surface 12a of the sleeve 12 are formed with a high-hardness iron metal, such as sintering or alloy tool steel, which is the same material as that of the sleeve 12. However, the surface of the sleeve 12 including the outer circumference and the inner circumferential surface 12a of the sleeve 12d is subjected to coating of any one of DLC, DLC-Si, CrN, TiN, TiCN, WCC, VC, etc., or film formation treatment of any one of a manganese phosphate film, a molybdenum disulfide film, etc.

The swing axis pivot portion 2k is formed with iron metal, such as cast iron, or an Al—Si alloy metal, which is the same material as that of the swing scroll 2. However, the surface of the swing scroll 2 including the swing axis pivot portion 2k is subjected to coating of any one of DLC, DLC-Si, CrN, TiN, TiCN, WCC, VC, etc., or film formation treatment of any one of a manganese phosphate film, a molybdenum disulfide film, etc.

The sliding portions of the scroll compressor according to Embodiment 5 are shown in Table 5. In Table 5, the name of each of the two components (Component 1, Component 2) that constitute the sliding portions and base materials of the components are shown and performing the surface treatment (represented as coating) or replacement to ceramic materials or resins described above to the components is clearly shown by the asterisk(*).

TABLE 5

| | | | Examples | | |
|---|---|---|---|---|---|
| Name | Portion | Base material | Coating | Ceramic | Resin |
| Sliding portion | | | | | |
| Component 1 | | | | | |
| Swing scroll | Bottom land | Iron base•Aluminum base | * | * | |
| | Oldham groove | Iron base•Aluminum base | * | * | * |
| | Swing axis pivot portion | Iron base•Aluminum base | * | * | |
| Fixed scroll | Bottom land | Iron base•Aluminum base | * | * | |
| Frame A | Frame bearing | Iron base•Aluminum base | * | * | * |
| | Oldham groove | Iron base•Aluminum base | * | * | * |
| Frame B | Frame bearing | Iron base•Aluminum base | * | * | * |
| | Secondary thrust bearing | Iron base•Aluminum base | * | * | * |
| Oldham ring | Key portion | Iron base•Aluminum base | * | * | * |
| | Key portion | Iron base•Aluminum base | * | * | * |
| Sleeve | Outer circumference | Iron base•Aluminum base | * | * | |
| | Inner circumference | Iron base•Aluminum base | * | * | |
| Thrust plate | Thrust surface | Iron base•Aluminum base | * | * | |
| Main axis | Swing bearing | Iron base•Aluminum base | * | * | * |
| | Outer circumference 1 | Iron base•Aluminum base | * | * | |
| | Outer circumference 2 | Iron base•Aluminum base | * | * | |
| | Axial thrust surface | Iron base•Aluminum base | * | * | |
| Thrust metal | Thrust surface | Iron base•Aluminum base | * | * | * |
| Component 2 | | | | | |
| Seal | Sliding surface | Resin (PPS, LCP, etc.) | | | |
| Oldham ring | Key portion | Iron base•Aluminum base | * | * | * |
| Sleeve | Inner circumference | Iron base•Aluminum base | * | * | |
| Seal | Sliding surface | Resin (PPS, LCP, etc.) | | | |

TABLE 5-continued

Sliding portion

| Name | Portion | Base material | Examples | | |
|---|---|---|---|---|---|
| | | | Coating | Ceramic | Resin |
| Main axis | Outer circumference 1 | Iron base•Aluminum base | * | * | |
| Oldham ring | Key portion | Iron base•Aluminum base | * | * | * |
| Main axis | Outer circumference 2 | Iron base•Aluminum base | * | * | |
| Main axis | Axial thrust surface | Iron base•Aluminum base | * | * | |
| Swing scroll | Oldham groove | Iron base•Aluminum base | * | * | * |
| Frame 1 | Oldham groove | Iron base•Aluminum base | * | * | * |
| Main axis | Swing bearing | Iron base•Aluminum base | * | * | * |
| Swing scroll | Swing axis pivot portion | Iron base•Aluminum base | * | * | |
| Thrust metal | Thrust surface | Iron base•Aluminum base | * | * | * |
| Sleeve | Outer circumference | Iron base•Aluminum base | * | * | |
| Frame A | Frame bearing | Iron base•Aluminum base | * | * | * |
| Frame B | Frame bearing | Iron base•Aluminum base | * | * | * |
| Frame B | Secondary thrust bearing | Iron base•Aluminum base | * | * | * |
| Thrust plate | Thrust surface | Iron base•Aluminum base | * | * | |

The scroll compressor according to Embodiment 5 also uses, as a refrigerant, the refrigerant which is a halogenated hydrocarbon or a hydrocarbon each having a carbon double bond in the composition thereof or a mixture containing thereof. However, the sliding surfaces of the sliding portions, whose temperature is likely to become high, are subjected to coating, film formation, or replacement to nonmetal materials, so that the iron or aluminum metal that can serve as a metal catalyst that promotes the chemical reaction of the refrigerant is not directly exposed to the sliding surfaces of the sliding portions. Therefore, the decomposition or polymerization of the refrigerant is suppressed, and thus the generation of sludge is suppressed to suppress troubles of the compressor or blocking in a refrigeration circuit, which allows obtaining reliability over a long period of time of the compressor.

In addition, according to the structure of Embodiment 5, the swing bearing 5 that receives the centrifugal force or the load of the swing scroll 2 and the frame bearing 4c that supports the rotation of the main axis 10 are at the same position, and thus bending of the main axis 10 can be reduced. Therefore, pivot portion processing to the main axis 10, which is complicated processing, becomes unnecessary, and high-reliability and a high-performance scroll compressor can be obtained at a low cost.

Embodiment 6

Figure 17:
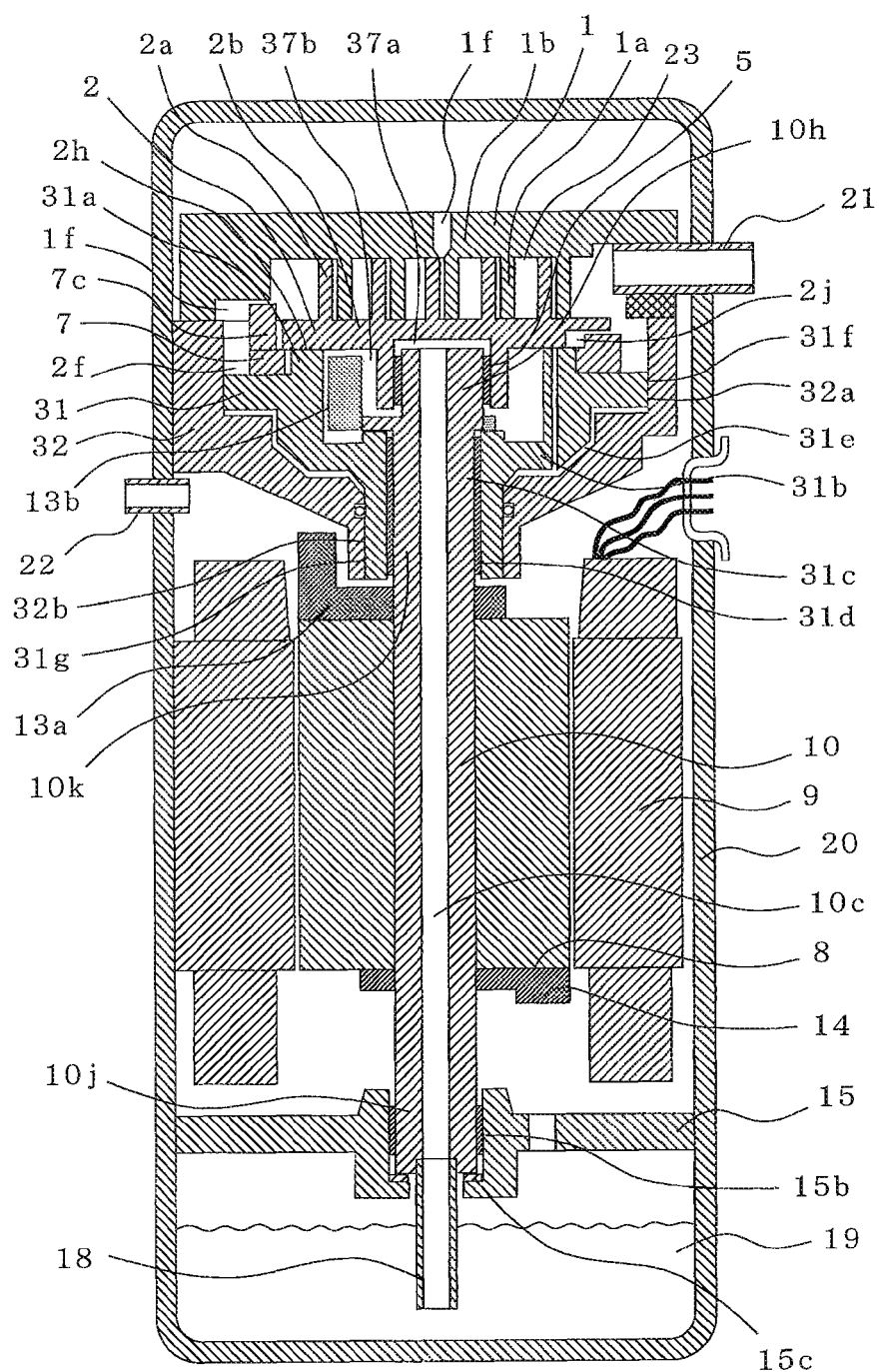
FIG. 17 is a cross sectional view showing the inside of the scroll compressor according to Embodiment 6 of the invention.

FIG. 17 is a cross sectional view showing the inside of the scroll compressor according to Embodiment 6 of the invention. Also here, portions different from Embodiments 1 to 4 will be mainly described. The outer circumferential portion of the fixed scroll 1 is fastened to a guide frame 32 with a bolt. Oldham grooves 1f are formed at the side of the panel 1b of the fixed scroll 1 on which the lap portion 1a is formed and slidably accommodate the upper convex portions 7c that are keys of the Oldham ring 7. Furthermore, the inhalation pipe 21 is press-fitted penetrating the sealed container 20 from the side surface of the fixed scroll 1. The Oldham grooves 2f are formed at the side of the panel 2b on which the lap portion 2a is formed on the swing scroll 2 facing the fixed scroll 1 and slidably accommodate the lower convex portions (not shown) that are keys of the Oldham ring 7. The swing bearing 5 is provided substantially at the center of the back surface opposite to the lap portion 2a of the panel 2b of the swing scroll 2. At the outer circumference of the back surface opposite to the lap portion 2a, a thrust bearing 2h is slidable to a thrust bearing portion 31a of a compliant frame 31. At the panel 2b of the swing scroll 2, an air bleed opening 2j that communicates the lap portion 2a side and the thrust bearing 2h side is formed. Thus, by the revolution of the swing scroll 2d, the air bleed opening 2j and an opening portion 31b of the compliant frame 31 open.

At the center of the compliant frame 31, a main bearing 31c that radially supports the main axis 10 rotated and driven by the electric motor and an auxiliary main bearing 31d are formed. Moreover, the compliant frame 31 is provided with an opening portion 31b that opens to a frame space 31e from the surface of the thrust bearing portion 31a. A refrigerant whose pressure is adjusted to an appropriate pressure by a pressure adjustment valve (not shown) passes through the air bleed opening 2j from the lap portion 2a side of the panel 2b of the swing scroll 2, and is taken into the frame space 31e through the opening portion 31b.

The outer circumference of the guide frame 32 is fixed to the sealed container 20 by shrink fitting or welding. At the upper inside of the guide frame 32, an upper sliding cylindrical surface 32a is formed and is engaged with an upper sliding cylindrical surface 31f formed at the upper portion of the outer circumferential surface of the compliant frame 31. At the lower inside of the guide frame 32, a lower sliding cylindrical surface 32b is formed and is engaged with a lower sliding cylindrical surface 31g formed at the lower portion of the outer circumferential surface of the compliant frame 31. A space defined by the inner circumferential surface of the guide frame 32, the upper sliding cylindrical surface 32a, the lower sliding cylindrical surface 32b, the compliant frame 31, the upper sliding cylindrical surface 31f, and the lower sliding cylindrical surface 31g is the frame space 31e.

At the upper end of the side of the swing scroll 2 of the main axis 10, a main axis decentrated portion 10h that is rotatably engaged with the swing bearing 5 is formed at the back surface opposite to the side of the panel 2b of the swing scroll 2 on which the lap portion 2a is formed. Moreover, a first balancer 13b is attached to the lower side thereof. At a further lower portion, a main axis portion 10k that is rotatably engaged with the main bearing 31c and the auxiliary main bearing 31d of the compliant frame 31 is formed.

At the lower end of the main axis 10, a secondary axis portion 10j that is rotatably engaged with a secondary bearing 15b of the sub-frame 15 is formed. Between the secondary axis portion 10j and the main axis portion 10k, the electric motor rotor 8 is attached. To the upper end side of the electric motor rotor 8, a second balancer 13a is fastened and to the lower end side thereof, a third balancer 14 is fastened. Thus, the static balance and the dynamic balance are maintained by three balancers including the first balancer 13b. To the lower end of the main axis 10, an oil pipe 18 is attached and pumps up lubricating oil of the oil sump 19 of the bottom of the sealed container 20 to supply the lubricating oil to each sliding portion through the oil hole 10a of the main axis 10. At the lowermost end of the main axis 10, the sub-frame 15 is provided with an axial thrust receiver 15c for supporting the self weight of the main axis 10.

Next, the operation of the scroll compressor will be described. Since the pressure inside the sealed container 20 becomes as high as that of a discharge gas atmosphere at a steady state, the lubricating oil of the oil sump 19 in the sealed container 20 is guided to a swing bearing space 37a through the oil pipe 18 and the oil hole 10c of the main axis 10. Then, the high-pressure lubricating oil is reduced by the swing bearing 5 to have an intermediate pressure that is higher than the inhalation pressure and is equal to or lower than the discharge pressure, and then flows into a boss outside space 37b. In contrast, the air bleed opening 2j provided at the mirror panel 2b of the swing scroll 2 always or intermittently opens to the vicinity of the thrust bearing of an opening portion 31b provided at the compliant frame 31. Therefore, the refrigerant having an intermediate pressure that is higher than the inhalation pressure and lower than the discharge pressure during compression from the compression chamber 23 formed by the fixed scroll 1 and the swing scroll 2 is guided to the frame space 31e through the air bleed opening 2j of the swing scroll 2 and the opening portion 31b of the compliant frame 31. To the compliant frame 31, the total force of the force resulting from the intermediate pressure of the boss outside space 37b and the pressing force from the swing scroll 2 through the thrust bearing 31a acts as a downward force. In contrast, the total force of the force resulting from the intermediate pressure of the frame space 31e and the force resulting from the high pressure that acts on a portion of the lower end surface exposed to the high-pressure atmosphere acts as an upward force. It is set that the upward force is larger than the downward force at a steady state. Therefore, with respect to the compliant frame 31, the upper sliding cylindrical surface 31f is guided to the upper sliding cylindrical surface 32a of the guide frame 32 and the lower sliding cylindrical surface 31g is guided to the lower sliding cylindrical surface 32b of the guide frame 32d. More specifically, the compliant frame 31 is slidable to the guide frame 32 and floats up at the side of the fixed scroll 1. The swing scroll 2 pressed against the compliant frame 31 through the thrust bearing 31a floats up at the upper portion. As a result, the tooth crest and the bottom land 2e of the swing scroll 2 contact the tooth crest and the bottom land 1e of the fixed scroll 1, respectively, and slide.

The thrust bearing 31a provided at the center of the compliant frame 31 and the thrust bearing 2h at the back surface opposite to the lap portion 2a of the panel 2b of the swing scroll 2 are slidable to each other and constitute the sliding portion. In the upper sliding cylindrical surface and the lower sliding cylindrical surface 31g of the compliant frame 31 and the upper sliding cylindrical surface 32a and the lower sliding cylindrical surface 32b of the guide frame 32, the upper portions and the lower portions are slidable to each other, respectively, and constitute the sliding portion.

The thrust bearing 31a, the upper sliding cylindrical surface 31f, and the lower sliding cylindrical surface 31g of the compliant frame 31 are formed with iron metal, such as cast iron, which is the same material as that of the compliant frame 31. However, the surface of the compliant frame 31 including the thrust bearing 31a, the upper sliding cylindrical surface 31f, and the lower sliding cylindrical surface 31g is subjected to coating of any one of DLC, DLC-Si, CrN, TiN, TiCN, WCC, VC, etc., or film formation treatment of any one of a manganese phosphate film, a molybdenum disulfide film, etc.

The upper sliding cylindrical surface 32a and the lower sliding cylindrical surface 32b of the guide frame 32 are formed with iron metal, such as cast iron, which is the same material as that of the guide frame 32. However, the surface of the guide frame 32 including the upper sliding cylindrical surface 32a and the lower sliding cylindrical surface 32b of the guide frame 32 is subjected to coating of any one of DLC, DLC-Si, CrN, TiN, TiCN, WCC, VC, etc., or film formation treatment of any one of a manganese phosphate film, a molybdenum disulfide film, etc.

The thrust bearing 2h at the back surface opposite to the lap portion 2a of the panel 2b of the swing scroll 2 is formed with iron metal, such as cast iron, or an Al—Si alloy metal, which is the same material as that of the swing scroll 2. However, the surface of the swing scroll 2 including the thrust bearing portion 2h is subjected to coating of any one of DLC, DLC-Si, CrN, TiN, TiCN, WCC, VC, etc., or film formation treatment of any one of a manganese phosphate film, a molybdenum disulfide film, etc.

The tooth crest of the swing scroll 2 and the bottom land of the fixed scroll 1 and the bottom land of the swing scroll 2 and the tooth crest of the fixed scroll 1 constitute sliding portions. The tooth crest and the bottom land of the swing scroll 2 are formed with iron metal, such as cast iron, or an Al—Si alloy metal, which is the same material as that of the swing scroll 2. However, the surface of the swing scroll 2 including the tooth crest and bottom land of the swing scroll 2d is subjected to coating of any one of DLC, DLC-Si, CrN, TiN, TiCN, WCC, VC, etc., or film formation treatment of any one of a manganese phosphate film, a molybdenum disulfide film, etc.

The tooth crest and the bottom land of the fixed scroll 1 are formed with iron metal, such as cast iron or an Al—Si alloy metal, which is the same material as that of the fixed scroll 1. However, the surface of the fixed scroll 1 including the tooth crest and the bottom land of the fixed scroll 1 is subjected to coating of any one of DLC, DLC-Si, CrN, TiN, TiCN, WCC, VC, etc., or film formation treatment of any one of a manganese phosphate film, a molybdenum disulfide film, etc.

The main bearing 31c and the auxiliary main bearing 31d provided at the middle portion of the compliant frame 31 and the main axis 10 and the secondary axis portion 10j at the lower end of the main axis 10 and the secondary bearing 15b of the sub-frame 15, and the lowest end of the main axis 10 and the axial thrust receiver 15c provided at the sub-frame 15 are slidable to each other, respectively, and constitute sliding portions. In these sliding portions, for the main bearing 31c and the auxiliary main bearing 31d of the compliant frame 31, a non-metal bearing containing PTFE, POM, carbon, etc., as the main ingredients is used.

The main axis portion 10k and the secondary axis portion 10j of the main axis 10 and the lowest end of the main axis 10 are formed with iron metal, such as iron, which is the same material as that of the main axis 10. However, the surface of the main axis 10 including the main axis portion 10k and the secondary axis portion 10j of the main axis 10 and the lowest end of the main axis 10 is subjected to coating of any one of DLC, DLC-Si, CrN, TiN, TiCN, WCC, VC, etc., or film formation treatment of any one of a manganese phosphate film, a molybdenum disulfide film, etc.

For the secondary bearing 15b of the sub-frame 15, a non-metal bearing containing PTFE, POM, carbon, etc., as the main ingredients is used. The axial thrust receiver 15c of the sub-frame 15 is formed with iron metal, such as iron, which is the same material as that of the sub-frame 15. However, the surface of the sub-frame 15 including the axial thrust receiver 15c of the sub-frame 15 is subjected to coating of any one of DLC-Si, CrN, TIN, TiCN, WCC, VC, etc., or film formation treatment of any one of a manganese phosphate film, a molybdenum disulfide film, etc.

The sliding portions of the scroll compressor according to Embodiment 6 are shown in Table 6. In Table 6, the name of each of the two components (Component 1, Component 2) that constitute the sliding portions and base materials of the components are shown and performing the surface treatment (represented as coating) or replacement to ceramic materials or resins described above to the components is clearly shown by the asterisk(*).

bond in the composition thereof or a mixture containing thereof. However, the sliding surfaces of the sliding portions, whose temperature is likely to become high, are subjected to coating, film formation, or replacement to non-metal materials, so that the iron or aluminum metal that can serve as a metal catalyst that promotes the chemical reaction of the refrigerant is not directly exposed to the sliding surfaces of the sliding portions. Therefore, the decomposition or polymerization of the refrigerant is suppressed, and thus the generation of sludge is suppressed to suppress troubles of the compressor or blocking in a refrigeration circuit, which allows obtaining reliability over a long period of time of the compressor.

In addition, according to the structure of Embodiment 6, the leak from the top end of the lap portion can be reduced, without using seal materials, by bringing the tooth crest and

TABLE 6

| | | | Sliding portion | | |
| | | | | Examples | |
| Name | Portion | Base material | Coating | Ceramic | Resin |
| Component 1 | | | | | |
| Swing scroll | Tooth crest | Iron base•Aluminum base | * | * | |
| | Bottom land | Iron base•Aluminum base | * | * | |
| | Oldham groove | Iron base•Aluminum base | * | * | * |
| | Thrust surface | Iron base•Aluminum base | * | * | * |
| | Swing bearing | Iron base•Aluminum base | * | * | * |
| Fixed scroll | Tooth crest | Iron base•Aluminum base | * | * | |
| | Bottom land | Iron base•Aluminum base | * | * | |
| | Oldham groove | Iron base•Aluminum base | * | * | * |
| Compliant frame | Thrust surface | Iron base•Aluminum base | * | * | |
| | Sliding cylindrical surface | Iron base•Aluminum base | * | * | |
| | Main bearing | Iron base•Aluminum base | * | * | * |
| | Auxiliary main bearing | Iron base•Aluminum base | * | * | * |
| Guide frame | Sliding surface | Iron base•Aluminum base | * | * | * |
| Oldham ring | Key portion | Iron base•Aluminum base | * | * | * |
| | Key portion | Iron base•Aluminum base | * | * | * |
| Main axis | Swing axis | Iron base•Aluminum base | * | * | |
| | Main axis portion | Iron base•Aluminum base | * | * | |
| | Main axis portion | Iron base•Aluminum base | * | * | |
| | Lowest end | Iron base•Aluminum base | * | * | |
| | Secondary axis portion | Iron base•Aluminum base | * | * | |
| Sub-frame | Secondary axis portion | Iron base•Aluminum base | * | * | * |
| | Axial thrust surface | Iron base•Aluminum base | * | * | |
| Component 2 | | | | | |
| Fixed scroll | Bottom land | Iron base•Aluminum base | * | * | |
| Fixed scroll | Tooth crest | Iron base•Aluminum base | * | * | |
| Oldham ring | Key portion | Iron base•Aluminum base | * | * | * |
| Compliant frame | Thrust surface | Iron base•Aluminum base | * | * | |
| Main axis | Swing axis | Iron base•Aluminum base | * | * | |
| Swing scroll | Bottom land | Iron base•Aluminum base | * | * | |
| Swing scroll | Tooth crest | Iron base•Aluminum base | * | * | |
| Oldham ring | Key portion | Iron base•Aluminum base | * | * | * |
| Swing scroll | Thrust surface | Iron base•Aluminum base | * | * | * |
| Guide frame | Sliding surface | Iron base•Aluminum base | * | * | * |
| Main axis | Outer circumference 1 | Iron base•Aluminum base | * | * | |
| Main axis | Outer circumference 2 | Iron base•Aluminum base | * | * | |
| Compliant frame | Sliding cylindrical surface | Iron base•Aluminum base | * | * | |
| Swing scroll | Oldham groove | Iron base•Aluminum base | * | * | * |
| Fixed scroll | Oldham groove | Iron base•Aluminum base | * | * | * |
| Swing scroll | Swing bearing | Iron base•Aluminum base | * | * | * |
| Compliant frame | Main bearing | Iron base•Aluminum base | * | * | * |
| Compliant frame | Auxiliary main bearing | Iron base•Aluminum base | * | * | * |
| Sub-frame | Axial thrust surface | Iron base•Aluminum base | * | * | |
| Sub-frame | Secondary bearing | Iron base•Aluminum base | * | * | * |
| Main axis | Secondary axis portion | Iron base•Aluminum base | * | * | |
| Main axis | Lowest end | Iron base•Aluminum base | * | * | |

The scroll compressor according to Embodiment 6 also uses, as a refrigerant, the refrigerant which is a halogenated hydrocarbon or a hydrocarbon each having a carbon double bond in the bottom land of the swing scroll 2 into contact with the bottom land and the tooth crest of the fixed scroll 1, respectively. Since a pivot portion is not provided, pivot portion processing becomes unnecessary. Thus, a high-reliability and high-performance scroll compressor can be obtained at a lower cost.

Embodiment 7

Figure 18:
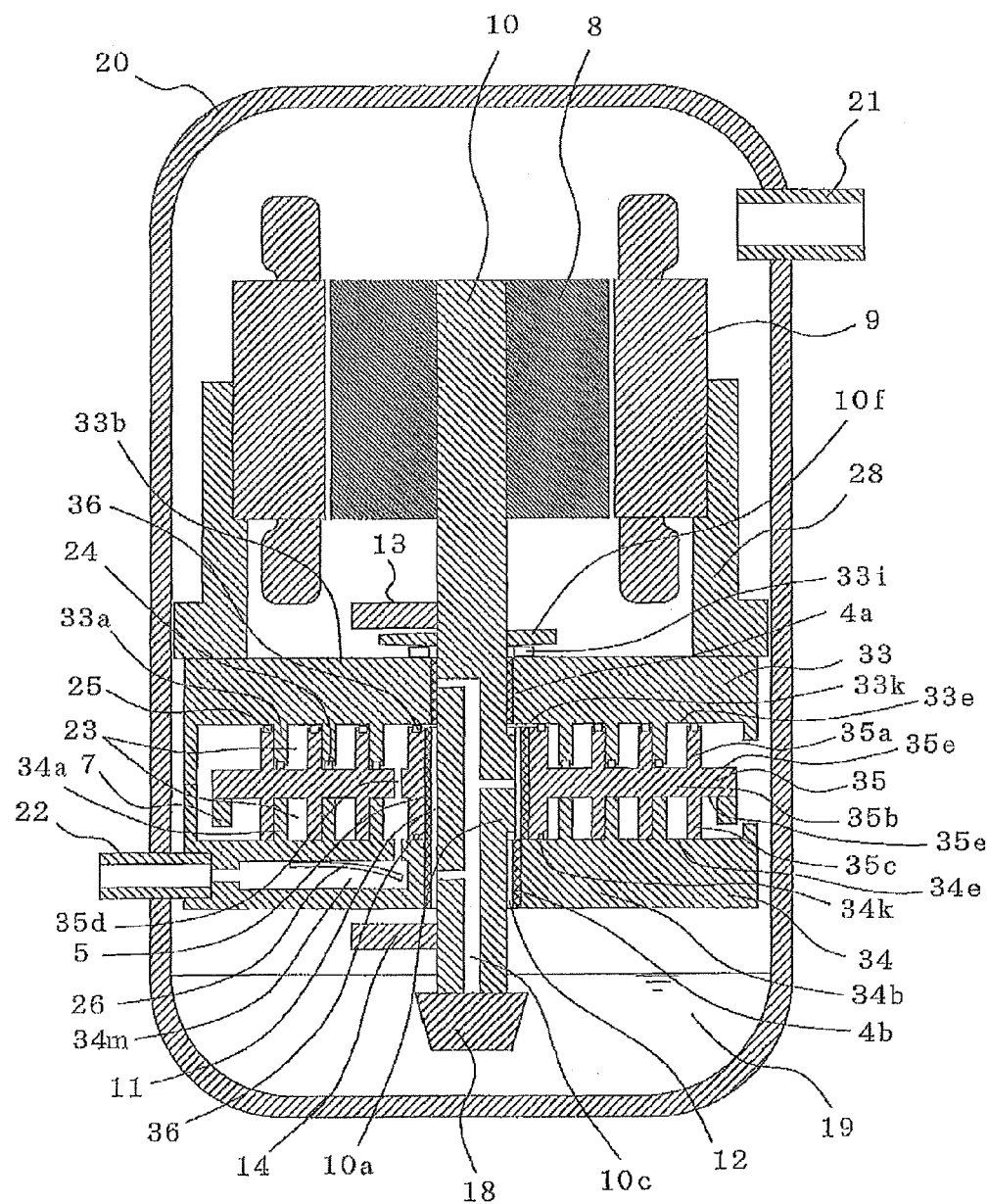
FIG. 18 is a cross sectional view showing the inside of the scroll compressor according to Embodiment 7 of the invention.

FIG. 18 is a cross sectional view showing the inside of the scroll compressor according to Embodiment 7 of the invention. Here, portions different from Embodiments 1 and 6 will be mainly described.

The compressor has the sealed container 20, in which an electric motor containing the electric motor stator 9 and the electric motor rotor 8 is accommodated in the container upper portion and a machine component that constitutes the compression mechanism portion for compressing a refrigerant is accommodated in the container lower portion. Above the electric motor at the upper portion of the side wall of the sealed container 20, the inhalation pipe 21 for inhaling a refrigerant gas protrudes to the side. From a position corresponding to the machine component of the lower portion of the side wall of the sealed container 20, the discharge pipe 22 for discharging a compressed refrigerant to the outside protrudes. In the electric motor, the upper portion of the main axis 10 is inserted to the electric motor rotor 8, the central portion of the main axis 10 penetrates the machine component to extend to the lower portion of the sealed container 20, and the oil pump 18 is provided at the lowest end of the main axis 10 and is immersed in lubricating oil enclosed in the oil sump 19 at the lower portion of the sealed container. The oil pump 18 is driven by the rotation of the main axis 10 driven by the electric motor rotor 8. In order to supply the lubricating oil pumped up by the oil pump 18 to each sliding portion of the machine component, the oil hole 10c is formed at the main axis while penetrating the main axis 10.

The machine component constituting the compression mechanism portion has a pair of upper and lower fixed scrolls 33 and 34. The respective fixed scrolls 33 and 34 are fixed onto the inner wall face of the sealed container 20 through the holder 28. Above the upper fixed scroll 33, the electric motor stator 9 is fixed through the holder 28. At the center of the mirror panel 33b of the upper fixed scroll 33, an upper main bearing 4a for passing the main axis 10 is provided. At the lower face of a mirror panel 33b, a spiral-shaped lap portion 33a is provided. The lower fixed scroll 34 is substantially symmetrical to the upper fixed scroll 33. At the center of a mirror panel 34b of the lower fixed scroll 34, a lower main bearing 4b for passing the main axis 10 and accommodating the sleeve 12 is provided. At the upper surface of the mirror panel 34b, a spiral-shaped lap portion 34a is provided. Then, the pair of upper and lower fixed scrolls 33 and 34 are disposed so that the spiral sides face each other. A swing scroll 35 is disposed between these fixed scrolls 33 and 34. The swing scroll 35 has spiral-shaped lap portions 35a and 35c at both the upper and lower sides of a disk-like mirror panel 35b. At the center of the mirror panel 35b, the swing bearing 5 for passing the decentrated slider portion 10a provided substantially at the center of the main axis 10 and accommodating the slider 11.

At the upper surface side of the panel 35b of the swing scroll 35, the surface of the lap portion 35a at the upper surface side of the swing scroll 35 contacts the surface of the lap portion 33a of the upper fixed scroll 33 at two or more portions, and compression chambers 23 for compressing a refrigerant gas are formed between the contact portions. At the lower surface side of the panel 35b of the swing scroll 35, the compression chambers 23 for compressing a refrigerant gas are formed between the lap portion 35c at the lower surface side of the swing scroll 35 and the lap portion 34a at the lower fixed scroll 34, similarly as in the upper surface side.

At the upper surface side of the panel 35b of the swing scroll 35, the seal 25 is provided at the tooth crest of the lap portion 35a at the upper surface side of the swing scroll 35 and the seal 24 is provided at the tooth crest of the lap portion 33a of the upper fixed scroll 33, respectively. Then, the swing scroll 35 is lightly pressed against the side of the lower fixed scroll 34 side with the back pressure of the seals 25 and 24. Thus, the tooth crest of the lap portion 35C at the lower side of the swing scroll 35 and the bottom land 34e of the lower fixed scroll 34 are brought into moderate contact with each other and the bottom land 35e at the lower side of the swing scroll 35 and the tooth crest of the lap portion 34a of the fixed scroll 34 are brought into moderate contact with each other. Thus, the leak of the refrigerant from the tooth crest of the lap portion is suppressed.

At the central portion of the swing scroll 35, the swing bearing 5 to which the decentrated slider portion 10a of the main axis 10 is inserted and which accommodates the slider 11 is formed. Boss portions having the almost same height as the height of the lap portions 35a and 35c are formed at both ends of the swing bearing 5 and a seal ring 36 for dividing the compression chamber 23 and a space for accommodating the slider 11 is provided and slides with seal ring sliding surfaces 33k and 34k of the upper and lower fixed scrolls 33 and 34. The decentrated slider portion 10a of the main axis 10 is decentrated relative to the rotation center of the main axis 10 by the length in which the surfaces of the upper and lower lap portions 35a and 35c of the swing scroll 35 contact the surfaces of the lap portions 33a and 34a of the fixed scroll 33 and 34, respectively.

At the side of the outer circumference of the upper and lower fixed scrolls 33 and 34, an inhalation port through which a refrigerant flows into the compression chambers 23 from the inside of the sealed container 20 is provided. In the compression chambers 23 formed by the upper and lower fixed scrolls 33 and 34 and the swing scroll 35, the refrigerant flows from the outside to the inside of the spiral shape. The refrigerant compressed in the compression chamber 23 between the lap portion 33a of the upper fixed scroll 33 and the lap portion 35a at the upper surface of the swing scroll 35 passes through a communication hole 35d near the boss portions of the swing scroll 35, flows together with a refrigerant compressed in the compression chamber 23 between the lap portion 34a of the lower fixed scroll 34 and the lap portion 35c at the lower surface of the swing scroll 35, opens the discharge valve 26 near the bearing 4b of the lower fixed scroll 34, passes through the discharge pipe 22, and then is discharged to the outside of the sealed container 20.

Between the main axis 10 and the respective scrolls 33, 34, and 35, the upper main bearing 4a, the lower main bearing 4b, and the swing bearing 5 are provided, respectively, as previously described above. Between the decentrated slider portion 10a of the main axis 10 and the inner surface of the swing bearing 5 of the swing scroll 35, the slider 11 is engaged. The first pivot portion disposed at the decentrated slider portion 10a and the slide surface inside the slider 11 are in close contact with each other through lubricating oil to constitute a sliding portion. Between the inner surface of the lower main bearing 4b and the second pivot portion of the main axis 10, the sleeve 12 is engaged to be in close contact with each other through lubricating oil to constitute the sliding portion. Lubricating oil for lubricating these sliding portions is supplied through the oil hole 10c by driving the oil pump 18 by the rotation of the main axis 10.

The main axis 10 is provided with the balancers 13 and 14, which maintains the static balance and the dynamic balance of the swing scroll that eccentrically rotates, at the upper portion of the upper fixed scroll 33 and the lower portion of the lower fixed scroll 34, respectively. A thrust surface 10f of the main axis 10 and an axial thrust surface 33i of the upper fixed scroll 33 support the load in the perpendicular direction including the self weight of the main axis 10. At the outer circumferential side of the lap portions 33a and 35a between the upper fixed scroll 33 and the swing scroll 35, the Oldham ring 7 for suppressing the rotation of the swing scroll 35 and swinging the swing scroll 35 as predetermined is disposed.

The seals 24 and 25 and the seal ring 36 are formed with non-metal materials, such as PTFE, PPS, LCP, or ceramic materials. The seal 25 that slides with the bottom land 33e of the upper fixed scroll 33 is formed with iron metal, such as cast iron, or an Al—Si alloy metal, which is the same material as that of the upper fixed scroll 33. However, the surface of the upper fixed scroll 33 including the bottom land 33e of the upper fixed scroll 33 is subjected to coating of any one of DLC, DLC-Si, CrN, TiN, TiCN, WCC, VC, etc., or film formation treatment of any one of a manganese phosphate film, a molybdenum disulfide film, etc.

The bottom land 35e at the upper side of the panel 35b of the swing scroll 35 that slides with the seal 24 is formed with iron metal, such as cast iron, or an Al—Si alloy metal, which is the same material as that of the swing scroll 35. However, the surface of the swing scroll 35 including the bottom land 35e of the swing scroll 35 is subjected to coating of any one of DLC, DLC-Si, CrN, TiN, TiCN, WCC, VC, etc., or film formation treatment of any one of a manganese phosphate film, a molybdenum disulfide film, etc.

The seal ring sliding surface 33k of the upper fixed scroll 33 that slides with the seal ring 36 is formed with iron metal, such as cast iron, or an Al—Si alloy metal, which is the same material as that of the upper fixed scroll 33. However, the surface of the upper fixed scroll 33 including the seal ring sliding surface 33k of the upper fixed scroll 33 is subjected to coating of any one of DLC, DLC-Si, CrN, TiN, TiCN, WCC, VC, etc., or film formation treatment of any one of a manganese phosphate film, a molybdenum disulfide film, etc.

The seal ring sliding surface 34k of the lower fixed scroll 34 that slides with the other seal ring 36 is formed with iron metal, such as cast iron, or an Al—Si alloy metal, which is the same material as that of the lower fixed scroll 34. However, the surface of the lower fixed scroll 34 including the seal ring sliding surface 34k of the lower fixed scroll 34 is subjected to coating of any one of DLC, DLC-Si, CrN, TiN, TiCN, WCC, VC, etc., or film formation treatment of any one of a manganese phosphate film, a molybdenum disulfide film, etc.

The sliding portions of the scroll compressor according to Embodiment 7 are shown in Table 7. In Table 7, the name of each of the two components (Component 1, Component 2) that constitute the sliding portions and base materials of the components are shown and performing the surface treatment (represented as coating) or replacement to ceramic materials or resins described above to the components is clearly shown by the asterisk(*).

TABLE 7

Sliding portion

| Name | Portion | Base material | Coating | Ceramic | Resin |
|---|---|---|---|---|---|
| Component 1 | | | | | |
| Upper fixed scroll | Tooth side surface | Iron base•Aluminum base | * | * | |
| | Bottom land | Iron base•Aluminum base | * | * | |
| | Axial thrust surface | Iron base•Aluminum base | * | * | * |
| | Upper main bearing | Iron base•Aluminum base | * | * | * |
| | Seal ring sliding surface | Iron base•Aluminum base | * | * | |
| Swing scroll | Upper spiral-shaped tooth side surface | Iron base•Aluminum base | * | * | |
| | Upper spiral-shaped bottom land | Iron base•Aluminum base | * | * | |
| | Swing bearing | Iron base•Aluminum base | * | * | * |
| | Oldham groove | Iron base•Aluminum base | * | * | * |
| | Lower spiral-shaped tooth side surface | Iron base•Aluminum base | * | * | |
| | Lower spiral-shaped bottom land | Iron base•Aluminum base | * | * | |
| | Lower spiral-shaped tooth crest | Iron base•Aluminum base | * | * | |
| Lower fixed scroll | Tooth side surface | Iron base•Aluminum base | * | * | |
| | Tooth crest | Iron base•Aluminum base | * | * | |
| | Bottom land | Iron base•Aluminum base | * | * | |
| | Oldham groove | Iron base•Aluminum base | * | * | * |
| | Lower main bearing | Iron base•Aluminum base | * | * | * |
| | Seal ring sliding surface | Iron base•Aluminum base | * | * | |
| Oldham ring | Key portion | Iron base•Aluminum base | * | * | * |
| | Key portion | Iron base•Aluminum base | * | * | * |
| Slider | Outer circumference | Iron base•Aluminum base | * | * | |
| | Slide surface | Iron base•Aluminum base | * | * | |
| Sleeve | Outer circumference | Iron base•Aluminum base | * | * | |
| | Inner circumference | Iron base•Aluminum base | * | * | |
| Main axis | Outer circumference | Iron base•Aluminum base | * | * | |
| | Thrust surface | Iron base•Aluminum base | * | * | |
| | First pivot portion | Iron base•Aluminum base | * | * | |
| | Second pivot portion | Iron base•Aluminum base | * | * | |
| Component 2 | | | | | |
| Swing scroll | Upper spiral-shaped tooth side surface | Iron base•Aluminum base | * | * | |
| Seal | Sliding surface | Resin (PPS, LCP, etc.) | | | |
| Main axis | Thrust surface | Iron base•Aluminum base | * | * | |
| Main axis | Outer circumference | Iron base•Aluminum base | * | * | |
| Seal ring | Sliding surface | Resin (PPS, LCP, etc.) | | | |

TABLE 7-continued

Sliding portion

| Name | Portion | Base material | Examples Coating | Ceramic | Resin |
|---|---|---|---|---|---|
| Upper fixed scroll | Tooth side surface | Iron base•Aluminum base | * | * | |
| Seal | Sliding surface | Resin (PPS, LCP, etc.) | | | |
| Slider | Outer circumference | Iron base•Aluminum base | * | * | |
| Oldham ring | Key portion | Iron base•Aluminum base | * | * | * |
| Lower fixed scroll | Tooth side surface | Iron base•Aluminum base | * | * | |
| Lower fixed scroll | Tooth crest | Iron base•Aluminum base | * | * | |
| Lower fixed scroll | Bottom land | Iron base•Aluminum base | * | * | |
| Swing scroll | Lower spiral-shaped tooth side surface | Iron base•Aluminum base | * | * | |
| Swing scroll | Lower spiral-shaped bottom land | Iron base•Aluminum base | * | * | |
| Swing scroll | Lower spiral-shaped tooth crest | Iron base•Aluminum base | * | * | |
| Oldham ring | Key portion | Iron base•Aluminum base | * | * | * |
| Sleeve | Outer circumference | Iron base•Aluminum base | * | * | |
| Seal ring | Sliding surface | Resin (PPS, LCP, etc.) | | | |
| Swing scroll | Oldham groove | Iron base•Aluminum base | * | * | * |
| Lower fixed scroll | Oldham groove | Iron base•Aluminum base | * | * | * |
| Swing scroll | Swing bearing | Iron base•Aluminum base | * | * | |
| Main axis | First pivot portion | Iron base•Aluminum base | * | * | |
| Lower fixed scroll | Lower main bearing | Iron base•Aluminum base | * | * | * |
| Main axis | Second pivot portion | Iron base•Aluminum base | * | * | |
| Upper fixed scroll | Upper main bearing | Iron base•Aluminum base | * | * | * |
| Upper fixed scroll | Axial thrust surface | Iron base•Aluminum base | * | * | * |
| Slider | Slide surface | Iron base•Aluminum base | * | * | |
| Sleeve | Inner circumference | Iron base•Aluminum base | * | * | |

The scroll compressor according to Embodiment 7 also uses, as a refrigerant, the refrigerant which is a halogenated hydrocarbon or a hydrocarbon each having a carbon double bond in the composition thereof or a mixture containing thereof. However, the sliding surfaces of the sliding portions, whose temperature is likely to become high, are subjected to coating, film formation, or replacement to non-metal materials, so that the iron or aluminum metal that can serve as a metal catalyst that promotes the chemical reaction of the refrigerant is not directly exposed to the sliding surfaces of the sliding portions. Therefore, the decomposition or polymerization of the refrigerant is suppressed, and thus the generation of sludge is suppressed to suppress troubles of the compressor or blocking in a refrigeration circuit, which allows obtaining reliability over a long period of time of the compressor.

Next, the operation of the scroll compressor will be described. When the electric motor rotor 8 is driven by the application of a voltage to the electric motor stator, the main axis 10 rotates around the axial center. During the operation, the decentrated slider portion 10a of the main axis 10 revolves relative to the axial center (rotation center). By the revolution movement, the swing scroll 35 with which the decentrated slider portion 10a is engaged slides relative to the upper and lower fixed scrolls 33 and 34. Due to the Oldham ring 7 that suppresses the rotation of the swing scroll 35, the swing scroll 35 can swing without rotating. Then, at the upper and lower surfaces of the panel 35b of the swing scroll 35, the respective contact portions of the respective lap portions 35a, 33a, 35c, and 34a move toward the center and each compression chamber 23 moves toward the center while reducing the capacity. By the operation, a refrigerant flows into the compression chamber 23 from the inhalation pipe 21 through the inhalation port, and is compressed, reaches the central portion of the lap portions 35a, 33a, 35c, and 34a, and then is discharged from the discharge pipe 22 through the discharge port 34m.

The scroll compressor of Embodiment 7 has the spiral-shaped lap portions 35a and 35c at both the upper and lower sides of the disk-like panel 35b of the swing scroll 35 and can offset the thrust force generating in the swing scroll 35. This eliminates the necessity of having a thrust bearing structure. The swing scroll 35 is lightly pressed against the lower fixed scroll 34 due to the back pressure of the seal 25 disposed at the tooth crest of the upper lap portion of the swing scroll 35, the tooth crest of the lower lap portion 35c of the swing scroll 35 and the bottom land 34e of the lower fixed scroll 34 are brought into moderate contact with each other, and the bottom land 35e at the lower side of the swing scroll 35 and the tooth crest of the lap portion 34a of the fixed scroll 34 are brought into moderate contact with each other. Thus, the leak from the lap portion top end can be reduced without using a seal for the tooth crest of the lower lap portion of the swing scroll 35. Thus, a high-reliability and high-performance scroll compressor can be obtained at a lower cost.

The term "coating" used in Tables 1 to 7 shown in Embodiments 1 to 7 refers to performing coating or film formation treatment to the sliding surfaces with materials described in each Embodiment. The term "ceramics" refers to constituting at least the sliding surfaces with ceramic materials, such as silicon carbide, zirconium dioxide, or silicon nitride. The term "PTFE" refers to constituting at least the sliding surfaces with non-metal materials, such as resin, such as polytetrafluoroethylene, or carbon.

Even when not all but some of the sliding portions shown in Tables 1 to 7 are treated so that the iron metal or aluminum metal is not directly exposed, the occurrence of the decomposition or polymerization by the chemical reaction of the refrigerant is reduced. Thus, the present invention is effective. Moreover, even when the treatment is performed to the sliding surface of only one component of the components constituting the sliding portions, the present invention is effective.

| Reference Signs List | |
|---|---|
| 1 | Fixed scroll, |
| 1a | Fixed scroll lap portion, |
| 1b | Fixed scroll panel, |
| 1d | Fixed scroll lap portion side surface, |
| 1e | Fixed scroll bottom land, |
| 1f | Discharge port, |
| 1g | Fixed scroll Oldham groove, |
| 2 | Swing scroll, |
| 2a | Swing scroll lap portion, |
| 2b | Swing scroll panel, |
| 2d | Swing Scroll lap portion side surface, |
| 2e | Swing scroll bottom land, |
| 2f | Swing scroll Oldham groove, |
| 3 | Frame, |
| 3a | Frame inhalation port, |
| 3f | Frame Oldham groove, |
| 4 | Main Bearing, |
| 5 | Swing Bearing, |
| 6 | Thrust Plate, |
| 6a | Sliding surface, |
| 7 | Oldham ring, |
| 7a, 7b, 7c, and 7d | Key convex portion, |
| 8 | Electric motor rotor, |
| 9 | Electric motor stator, |
| 10 | Main Axis, |
| 10a | Decentrated slider axis, |
| 10b | Pump axis, |
| 10c | Oil hole, |
| 10d | First pivot portion, |
| 10e | Second pivot portion, |
| 11 | Slider, |
| 12 | Sleeve, |
| 13, 14 | Balancer, |
| 15 | Sub-frame, |
| 15a | Bearing storage portion, |
| 15b | Secondary bearing, |
| 15c | Axial thrust receiver, |
| 16 | Ball Bearing, |
| 18 | Oil Pump, |
| 19 | Oil sump, |
| 20 | Sealed container, |
| 20a | Sealed Container trunk portion, |
| 20b | Sealed container lower portion, |
| 20c | Sealed container upper portion, |
| 21 | Inhalation pipe, |
| 22 | Discharge pipe, |
| 23 | Compression chamber, |
| 24, 25 | Seal, |
| 26 | Discharge valve, |
| 27 | Slider plate, |
| 29 | First frame, |
| 30 | Second frame |

The invention claimed is:

1. A scroll compressor, in which there are provided a refrigerant, an electric motor portion, a compression mechanism portion compressing the refrigerant, the compression mechanism portion including a sliding portion and being connected to said electric motor portion, and an oil sump for lubricating oil in a sealed container, wherein
said refrigerant is a mixture of "HFO-1234yf" and "R32" or is a mixture of "HFO-1234yf" and "R41",
a sliding surface of at least one of two components constituting a sliding portion having a relation of sliding to each other in said sealed container is structured in such a way that an iron metal or an aluminum metal is not directly exposed to the refrigerant, and
the sliding surface of at least one of two components that constitute said sliding portion is subjected to coating treatment or coating film formation treatment with material that does not include iron and aluminum, and that suppresses decomposition or polymerization of said refrigerant, so that an iron metal or an aluminum metal is not directly exposed to the refrigerant.

2. The scroll compressor of claim 1, wherein said compression mechanism portion further includes:
a fixed scroll and a swing scroll that form a compression chamber by combining spiral portions in which the spiral directions are reverse to each other,
a swing bearing provided at the side of an anti-compression chamber of said swing scroll,
a frame that supports a thrust bearing surface of said swing scroll through a thrust plate,
an Oldham ring including upper and lower convex portions serving as keys which are accommodated in said swing scroll and said frame to prevent rotation of said swing scroll, respectively,
a main axis that transmits a driving force to said swing scroll, penetrates a main bearing provided at the central portion of said frame, and is connected to an oil pump for supplying lubricating oil in said oil sump to said sliding portion,
a slider rotatably stored in said swing bearing and into which said main axis is inserted, and
a sleeve rotatably stored in said main bearing, and wherein
a slider surface inside said slider is subjected to said coating treatment or said coating film treatment.

3. The scroll compressor of claim 2, wherein a slider plate is provided between said main axis and said slider, and said slider plate is subjected to said coating treatment or said coating film treatment.

4. The scroll compressor of claim 1, wherein said compression mechanism portion further includes:
a fixed scroll and a swing scroll that form a compression chamber by combining spiral portions in which the spiral directions are reverse to each other,
an Oldham ring including upper and lower convex portions serving as keys which are accommodated in said fixed scroll and said swing scroll to prevent rotation of said swing scroll,
a swing bearing provided at the side of an anti-compression chamber of said swing scroll,
a thrust bearing member provided at a thrust surface of said swing scroll,
a frame that supports said thrust bearing member through a thrust plate,
a main axis that transmits a driving force to said swing scroll, penetrates a main bearing provided at the central portion of said frame, and is connected to an oil pump for supplying lubricating oil in said oil sump to said sliding portion,
a slider rotatably stored in said swing bearing and into which said main axis is inserted,
a slider plate provided between said main axis and said slider, and
a sleeve rotatably stored in said main bearing, and wherein
a slider surface inside said slider or said slider plate is subjected to said coating treatment or said coating film treatment.

5. The scroll compressor of claim 1, wherein said compression mechanism portion further includes:
a fixed scroll and a swing scroll that form a compression chamber by combining spiral portions in which the spiral directions are reverse to each other,
a swing bearing provided at the side of an anti-compression chamber of said swing scroll,
a thrust plate provided at a thrust surface of said swing scroll, a frame provided with a thrust bearing member at a portion supporting said thrust plate,
an Oldham ring including upper and lower convex portions serving as keys which are accommodated in said swing scroll and said frame to prevent rotation of said swing scroll,
a main axis that transmits a driving force to said swing scroll, penetrates a main bearing provided at the central portion of said frame, and is connected to an oil pump for supplying lubricating oil in said oil sump to each sliding portion,
a slider rotatably stored in said swing bearing and into which said main axis is inserted,
a slider plate provided between said main axis and said slider, and
a sleeve rotatably stored in said main bearing, and wherein
a slider surface inside said slider or said slider plate is subjected to said coating treatment or said coating film treatment.

6. The scroll compressor of claim 1, wherein said compression mechanism portion further includes:
a fixed scroll and a swing scroll that form a compression chamber by combining spiral portions in which the spiral directions are reverse to each other,
a swing axis pivot portion provided at the side of an anti-compression chamber of said swing scroll,
a thrust plate provided at a thrust surface of said swing scroll,
a first frame provided with a thrust bearing member at a portion supporting said thrust plate,
a second frame disposed at a lower portion of said first frame,
an Oldham ring including upper and lower convex portions serving as keys which are accommodated in said swing scroll and said first frame to prevent rotation of said swing scroll,
a main axis that transmits a driving force to said swing scroll, penetrates an upper main bearing provided at the central portion of said first frame and a lower main bearing provided at the central portion of said second frame, and is connected to an oil pump for supplying lubricating oil in said oil sump to said sliding portion and whose self weight is supported by a secondary thrust bearing of said second frame,
a sleeve for accommodating said swing axis pivot portion, and
a swing bearing for rotatably accommodating said sleeve in said axis.

7. The scroll compressor of claim 1, wherein said compression mechanism portion further includes:
a fixed scroll and a swing scroll that form a compression chamber by combining spiral portions in which the spiral directions are reverse to each other,
an Oldham ring including upper and lower convex portions serving as keys which are accommodated in said fixed scroll and said swing scroll to prevent rotation of said swing scroll,
a swing bearing provided at the side of an anti-compression chamber of said swing scroll,
a compliant frame that supports a thrust surface of said swing scroll,
a guide frame that slidably accommodates said compliant frame, and
a main axis that transmits a driving force to said swing scroll, penetrates a main bearing and an auxiliary main bearing provided at the central portion of said compliant frame, and is connected to an oil pump for supplying lubricating oil in said oil sump to said sliding portion, and whose self weight is supported by an axial thrust receiver of a sub-frame.

8. The scroll compressor of claim 1, wherein said compression mechanism portion further includes:
a pair of fixed scrolls in which spiral portions are disposed facing each other,
a swing scroll that is provided between said pair of fixed scrolls and has spiral portions to be engaged with spiral portions of said pair of fixed scrolls, respectively, at both sides of the axis direction to form a compression chamber in cooperation with said pair of fixed scrolls,
an Oldham ring including upper or lower convex portions serving as keys which are accommodated in one of said fixed scrolls and the remaining upper or lower convex portions serving as keys which are accommodated in said swing scroll to prevent rotation of said swing scroll,
a swing bearing that penetrates the central portion of said swing scroll,
an upper main bearing and a lower main bearing provided at the central portion of each of said fixed scrolls,
a main axis that penetrates said swing bearing, said upper main bearing, and said lower main bearing being connected to an oil pump for supplying lubricating oil in said oil sump to said sliding portion, and whose self weight is supported by an axial thrust surface of one of said fixed scrolls,
a slider rotatably stored in said swing bearing and into which said main axis is inserted, and
a sleeve rotatably stored in said lower main bearing, and wherein
a slider surface inside said slider is subjected to said coating treatment or said coating film treatment.

9. A scroll compressor, in which there are provided a refrigerant, an electric motor portion, a compression mechanism portion compressing the refrigerant, the compression mechanism portion including a sliding portion and being connected to said electric motor portion, and an oil sump for lubricating oil in a sealed container, wherein
said refrigerant is a mixture of "HFO-1234yf" and "R32" or is a mixture of "HFO-1234yf" and "R41",
a sliding surface of at least one of two components constituting a sliding portion having a relation of sliding to each other in said sealed container is structured in such a way that an iron metal or an aluminum metal is not directly exposed to the refrigerant, and
the sliding surface of at least one of two components that constitute said sliding portion is formed with a ceramic material or resin, so that an iron metal or an aluminum metal is not directly exposed to the refrigerant.

10. The scroll compressor of claim 9, wherein said compression mechanism portion further includes:
a fixed scroll and a swing scroll that form a compression chamber by combining spiral portions in which the spiral directions are reverse to each other,
a swing bearing provided at the side of an anti-compression chamber of said swing scroll,
a frame that supports a thrust bearing surface of said swing scroll through a thrust plate,
an Oldham ring including upper and lower convex portions serving as keys which are accommodated in said swing scroll and said frame to prevent rotation of said swing scroll, respectively,
a main axis that transmits a driving force to said swing scroll, penetrates a main bearing provided at the central portion of said frame, and is connected to an oil pump for supplying lubricating oil in said oil sump to said sliding portion, a slider rotatably stored in said swing bearing and into which said main axis is inserted, and a sleeve rotatably stored in said main bearing, and wherein a slider surface inside said slider is formed with said ceramic material or said resin.

11. The scroll compressor of claim 10, wherein a slider plate is provided between said main axis and said slider, and a slider surface of said slider plate is formed with said ceramic material or said resin.

12. The scroll compressor of claim 9, wherein said compression mechanism portion further includes:

a fixed scroll and a swing scroll that form a compression chamber by combining spiral portions in which the spiral directions are reverse to each other, an Oldham ring including upper and lower convex portions serving as keys which are accommodated in said fixed scroll and said swing scroll to prevent rotation of said swing scroll, a swing bearing provided at the side of an anti-compression chamber of said swing scroll, a thrust bearing member provided at a thrust surface of said swing scroll, a frame that supports said thrust bearing member through a thrust plate, a main axis that transmits a driving force to said swing scroll, penetrates a main bearing provided at the central portion of said frame, and is connected to an oil pump for supplying lubricating oil in said oil sump to said sliding portion, a slider rotatably stored in said swing bearing and into which said main axis is inserted, a slider plate provided between said main axis and said slider, and a sleeve rotatably stored in said main bearing, and wherein a slider surface inside said slider or a slider surface of said slider plate is formed with said ceramic material or said resin.

13. The scroll compressor of claim 9, wherein said compression mechanism portion further includes:

a fixed scroll and a swing scroll that form a compression chamber by combining spiral portions in which the spiral directions are reverse to each other, a swing bearing provided at the side of an anti-compression chamber of said swing scroll, a thrust plate provided at a thrust surface of said swing scroll, a frame provided with a thrust bearing member at a portion supporting said thrust plate, an Oldham ring including upper and lower convex portions serving as keys which are accommodated in said swing scroll and said frame to prevent rotation of said swing scroll, a main axis that transmits a driving force to said swing scroll, penetrates a main bearing provided at the central portion of said frame, and is connected to an oil pump for supplying lubricating oil in said oil sump to each sliding portion, a slider rotatably stored in said swing bearing and into which said main axis is inserted, a slider plate provided between said main axis and said slider, and a sleeve rotatably stored in said main bearing, and wherein a slider surface inside said slider or a slider surface of said slider plate is formed with said ceramic material or said resin.

14. The scroll compressor of claim 9, wherein said compression mechanism portion further includes:

a fixed scroll and a swing scroll that form a compression chamber by combining spiral portions in which the spiral directions are reverse to each other, a swing axis pivot portion provided at the side of an anti-compression chamber of said swing scroll, a thrust plate provided at a thrust surface of said swing scroll, a first frame provided with a thrust bearing member at a portion supporting said thrust plate, a second frame disposed at a lower portion of said first frame, an Oldham ring including upper and lower convex portions serving as keys which are accommodated in said swing scroll and said first frame to prevent rotation of said swing scroll, a main axis that transmits a driving force to said swing scroll, penetrates an upper main bearing provided at the central portion of said first frame and a lower main bearing provided at the central portion of said second frame, and is connected to an oil pump for supplying lubricating oil in said oil sump to said sliding portion and whose self weight is supported by a secondary thrust bearing of said second frame, a sleeve for accommodating said swing axis pivot portion, and a swing bearing for rotatably accommodating said sleeve in said axis.

15. The scroll compressor of claim 9, wherein said compression mechanism portion further includes:

a fixed scroll and a swing scroll that form a compression chamber by combining spiral portions in which the spiral directions are reverse to each other, an Oldham ring including upper and lower convex portions serving as keys which are accommodated in said fixed scroll and said swing scroll to prevent rotation of said swing scroll, a swing bearing provided at the side of an anti-compression chamber of said swing scroll, a compliant frame that supports a thrust surface of said swing scroll, a guide frame that slidably accommodates said compliant frame, and a main axis that transmits a driving force to said swing scroll, penetrates a main bearing and an auxiliary main bearing provided at the central portion of said compliant frame, and is connected to an oil pump for supplying lubricating oil in said oil sump to said sliding portion, and whose self weight is supported by an axial thrust receiver of a sub-frame.

16. The scroll compressor of claim 9, wherein said compression mechanism portion further includes:

a pair of fixed scrolls in which spiral portions are disposed facing each other, a swing scroll that is provided between said pair of fixed scrolls and has spiral portions to be engaged with spiral portions of said pair of fixed scrolls, respectively, at both sides of the axis direction to form a compression chamber in cooperation with said pair of fixed scrolls, an Oldham ring including upper or lower convex portions serving as keys which are accommodated in one of said fixed scrolls and the remaining upper or lower convex portions serving as keys are accommodated in said swing scroll to prevent rotation of said swing scroll, a swing bearing that penetrates the central portion of said swing scroll, an upper main bearing and a lower main bearing provided at the central portion of each of said fixed scrolls, a main axis that penetrates said swing bearing, said upper main bearing, and said lower main bearing being connected to an oil pump for supplying lubricating oil in said oil sump to said sliding portion, and whose self weight is supported by an axial thrust surface of one of said fixed scrolls, a slider rotatably stored in said swing bearing and into which said main axis is inserted, and a sleeve rotatably stored in said lower main bearing, and wherein a slider surface inside said slider is formed with said ceramic material or said resin.

* * * * *